(12) United States Patent
O'Connor et al.

(10) Patent No.: US 11,496,477 B2
(45) Date of Patent: Nov. 8, 2022

(54) SYSTEMS AND METHODS FOR ONBOARDING AND MANAGING APPLICATIONS OVER NETWORKS

(71) Applicant: ACEISS, INC., New Canaan, CT (US)

(72) Inventors: Lloyd O'Connor, New Canaan, CT (US); Brian Jou, Rego Park, NY (US); Nigel John Slinn, Northamptonshire (GB); Cory Hacking, Salt Lake City, UT (US)

(73) Assignee: ACEISS, INC., New Canaan, CT (US)

( * ) Notice: Subject to any disclaimer, the term of this patent is extended or adjusted under 35 U.S.C. 154(b) by 0 days.

(21) Appl. No.: 17/686,922

(22) Filed: Mar. 4, 2022

(65) Prior Publication Data
US 2022/0286458 A1    Sep. 8, 2022

Related U.S. Application Data

(60) Provisional application No. 63/290,165, filed on Dec. 16, 2021, provisional application No. 63/157,169, filed on Mar. 5, 2021.

(51) Int. Cl.
*H04L 9/40*    (2022.01)

(52) U.S. Cl.
CPC ........ *H04L 63/101* (2013.01); *H04L 63/0876* (2013.01); *H04L 63/102* (2013.01); *H04L 63/104* (2013.01); *H04L 63/105* (2013.01)

(58) Field of Classification Search
CPC . H04L 63/101; H04L 63/0876; H04L 63/102; H04L 63/104
See application file for complete search history.

(56) References Cited

U.S. PATENT DOCUMENTS

| | | | |
|---|---|---|---|
| 9,875,592 B1 | 1/2018 | Erickson et al. | |
| 10,237,138 B2 | 3/2019 | Xie et al. | |
| 10,362,037 B2 | 7/2019 | Zou et al. | |
| 11,196,775 B1 * | 12/2021 | Badawy | G06F 21/64 |
| 11,308,186 B1 * | 4/2022 | Domsch | G06N 20/00 |
| 2008/0163159 A1 * | 7/2008 | Oara | G06F 8/10 717/104 |
| 2014/0075567 A1 | 3/2014 | Raleigh et al. | |
| 2016/0112443 A1 | 4/2016 | Grossman et al. | |

(Continued)

OTHER PUBLICATIONS

Farroha, et al. "Architecting Dynamic Privileges in Protected Systems Through Hardening Identity and Access Management," IEEE 2012, retrieved on May 2, 2022 from URL:https://ieeexplore.ieee.org/stamp/stamp.jsp?tp=&arnumber=6189527.

(Continued)

*Primary Examiner* — Harris C Wang
(74) *Attorney, Agent, or Firm* — Bryan Cave Leighton Paisner LLP

(57) ABSTRACT

This disclosure relates to systems, methods, and apparatuses for determining access models for applications. The access models can be determined using various techniques described herein. The access models can enable the applications to be onboarded into the enterprise system and, in some cases, can be utilized by an identity and access management (IdAM) system and/or identity and governance administration (IGA) system to facilitate ongoing identity management and access control functions for the applications in the enterprise system.

19 Claims, 13 Drawing Sheets

(56) References Cited

U.S. PATENT DOCUMENTS

| | | | |
|---|---|---|---|
| 2016/0205035 A1* | 7/2016 | Kurian | H04L 67/1085 |
| | | | 709/217 |
| 2016/0314127 A1* | 10/2016 | Har-Noy | G06Q 50/01 |
| 2020/0074015 A1* | 3/2020 | De Vansa Vikramaratne | |
| | | | G06F 16/904 |
| 2020/0112557 A1 | 4/2020 | McCullough, IV et al. | |
| 2020/0137097 A1 | 4/2020 | Zimmermann et al. | |
| 2020/0329115 A1 | 10/2020 | Walsh et al. | |
| 2021/0075693 A1* | 3/2021 | Su | H04L 41/046 |
| 2021/0160231 A1* | 5/2021 | Kumar | H04L 63/083 |

OTHER PUBLICATIONS

Patent Cooperation Treaty, International Written Opinion and Search Report for PCT/US2022/018979 dated May 18, 2022, 6 pages.

* cited by examiner

SYSTEMS AND METHODS FOR ONBOARDING AND MANAGING APPLICATIONS OVER NETWORKS

CROSS-REFERENCE TO RELATED APPLICATIONS

The present application claims priority to U.S. Provisional Patent Application No. 63/290,165 filed on Dec. 16, 2021 and U.S. Provisional Patent Application No. 63/157,169 filed on Mar. 5, 2021. The aforementioned applications are herein incorporated by reference in their entireties as if recited full herein

TECHNICAL FIELD

This disclosure is related to improved network and cyber-security techniques for onboarding, managing, and/or controlling access to applications in an enterprise system. This disclosure is also related to improved techniques for determining access models (or observing access usage) associated with applications.

BACKGROUND

Many enterprises provide internal networks that enable network users to access and utilize various applications. The number of applications offered by large enterprises can be significant and, in some cases, may be in the thousands. Moreover, in many cases, the applications utilize or manage confidential or sensitive information (e.g., such as financial data, legal documents, etc.), which can be subject to strict cybersecurity, regulatory, and/or compliance standards.

Enterprises are often reluctant to onboard new applications for use on their networks due to the stringent cybersecurity, regulatory, and compliance standards that apply to the applications utilized by the enterprises. In some cases, the enterprises may utilize identity software that assists with authenticating and authorizing users' access to applications. However, traditional identity software solutions are inadequate for several reasons.

One common deficiency of traditional identity software solutions is that they are difficult to integrate into enterprise systems, and they often require technical users to dedicate significant amounts of time integrating the identity software solutions. For example, integrating a traditional identity software solution typically requires the source code of each application to be manually modified for compatibility with the identity software, which can expend an enormous amount of time, effort, and resources. Another deficiency of traditional identity software solutions relates to the lack of homogeneity with respect to how applications are integrated with the identity software solutions, and how the underlying information for the applications is stored and/or accessed when needed (e.g., in response to a hacking event, compliance recertification, and/or other need). Another deficiency of traditional identity software solutions is the difficulty associated with modifying settings (e.g., changing permissions, adding/removing users, etc.) associated with the applications after the applications are integrated with the identity software solution. Again, this often requires manual customization of the applications' source codes.

As mentioned above, many enterprises provides large number of applications (e.g., hundreds or thousands), which are often associated with legacy systems that do not include identity software solutions. While it may be desired to integrate all of the applications with an identity software solution being utilized by the enterprise, doing so is not practical due to the time required to modify the code associated with each of the applications. In many cases, transitioning or integrating a large collection of applications from a legacy system with a particular identity software solution can take several years.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1A:
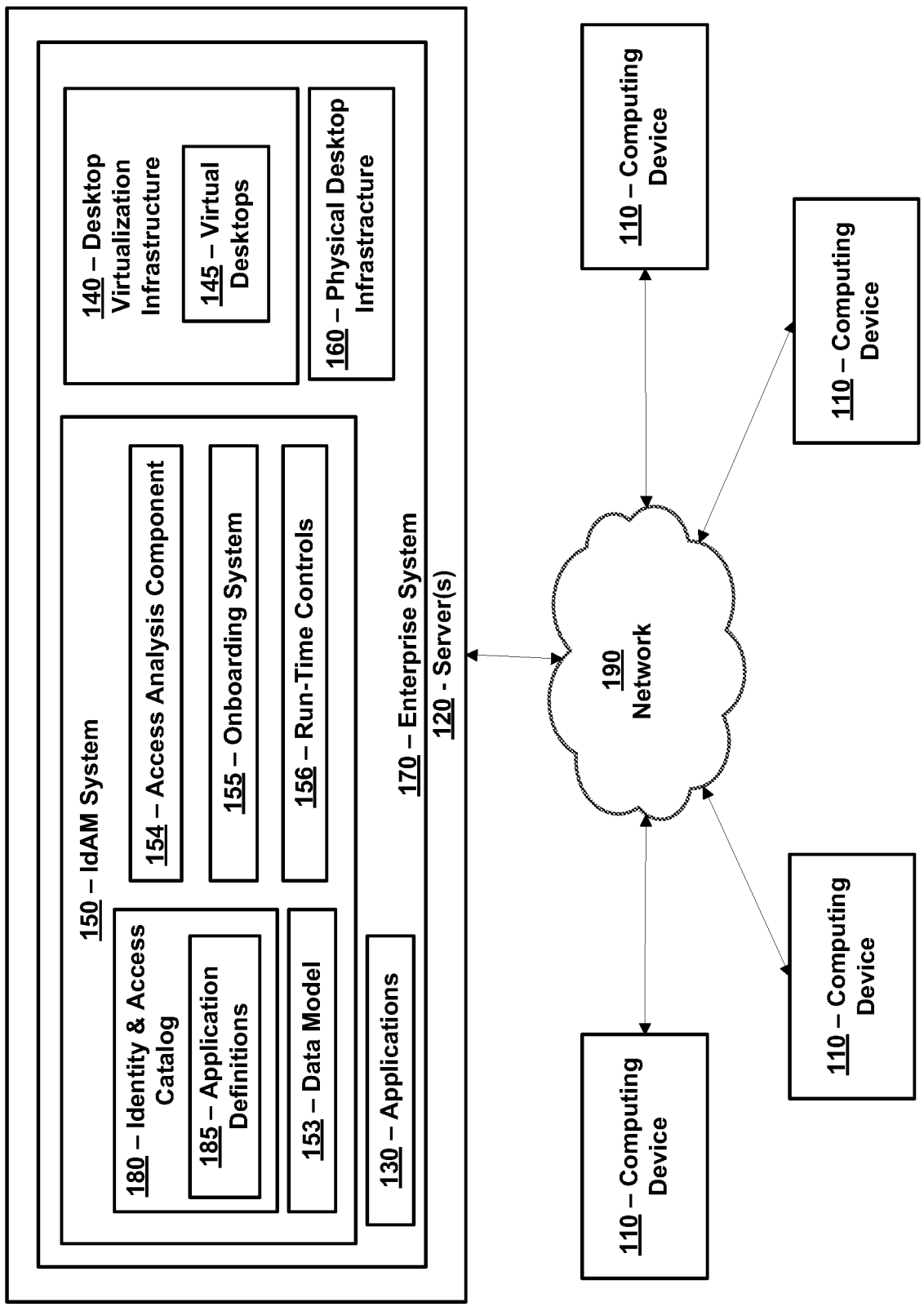
FIG. 1A is a block diagram of an exemplary system in accordance with certain embodiments.

The present disclosure relates to systems, methods, apparatuses, and techniques for providing an identity and access management (IdAM) system. The IdAM system provides a framework of policies and technologies to ensure that individuals in an enterprise have appropriate access to applications and other technology resources, and to mitigate the risk of unauthorized access to those applications and resources. In certain embodiments, the IdAM system stores a data model that abstracts security protocols, regulatory protocols, and/or other features of applications. The abstraction provided by the data model permits an onboarding system to quickly and easily onboard large quantities of applications into the IdAM system. In some embodiments, the onboarding system uses the data model to provide template-driven graphical user interfaces (GUIs) that facilitate the onboarding of applications by non-technical users without the need to modify underlying source codes of the applications.

Additionally, the data model can be used to generate an identity and access catalog that comprises application definitions for each application that is integrated with the IdAM system. Each application definition can incorporate and store security information, access permissions, entitlement profiles, and/or workflows for a corresponding application. The data included in the application definitions can be used to define or specify access models for various applications. Users can access the application definitions in various scenarios (e.g., in response to detected hacking events, recertification events, and/or for other purposes). When security information, compliance information, and/or settings of an application need to be updated or modified, the IdAM system can provide GUIs to users which facilitate quick and easy modification of the application definitions stored in the an identity and access catalog.

Furthermore, the data model permits the IdAM system to be platform-agnostic and to accommodate heterogeneity across diverse network configurations. For example, the IdAM system can provide digital identity and digital access functions for various types of applications (e.g., SaaS applications, locally installed applications, remotely installed applications, etc.) in various types of infrastructures (e.g., a desktop virtualization infrastructure, physical desktop infrastructure, or a combination of both). In certain embodiments, the IdAM system can serve as a centralized gateway controller that is able to provide selective access to separate subsets of users (e.g., users associated with different departments, geographic areas, user groups, etc.) for accessing the applications and resources provided through an enterprise network. In certain embodiments, the IdAM system can be configured to dynamically restrict and/or enable access to the applications by configuring end-user portals (or profiles associated with such portals or end-users) with appropriate permissions and entitlements based on the application definitions stored in the identity and access catalog, which are automatically applied when the portals access the network. Additionally, or alternatively, the IdAM system can communicate with separate applications or systems (e.g., a separate IGA application or system) that utilize the application definitions to perform these functions, as well as other functions related to identifying and mitigating unauthorized access risks to the enterprise systems or associated applications.

In certain embodiments, the IdAM system can include an access analysis component that cooperates with an IGA system to facilitate access control for legacy applications and/or other applications. The access analysis component can be configured to predict or determine access models for applications that are difficult to integrate with the IGA system (e.g., because certain information associated with the application definitions may be difficult to obtain from legacy applications). The functions executed by the access analysis component also be used to identify security risks (e.g., unauthorized access risks) associated with the access models of the applications, and to provide this risk information to the IGA system.

The access analysis component can execute various functions to collect information that enables the access models and associated authorization codes for applications to be determined. In many cases, the access analysis component can communicate with the applications themselves, as well as secondary sources of information within the enterprise network, to collect some of this information. Additionally, because the entitlements (e.g., access rights and privileges) associated with various authorization codes may be difficult to discern, the access analysis component can execute crowdsourcing functions to obtain missing information from various individuals (e.g., end-users of the applications, developers of the applications, administrators, etc.). The information collected by the access analysis component can then be utilized to model the risk of unauthorized access to the applications, and to integrate the applications with the IGA system.

Any data collected by the access analysis component can be stored in the application definitions in accordance with the data model described herein and/or can be stored by the IGA system. This information can be accessed and utilized to facilitate ongoing operations associated with monitoring and enforcing access rights and permissions within the enterprise network.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Figure 1B:
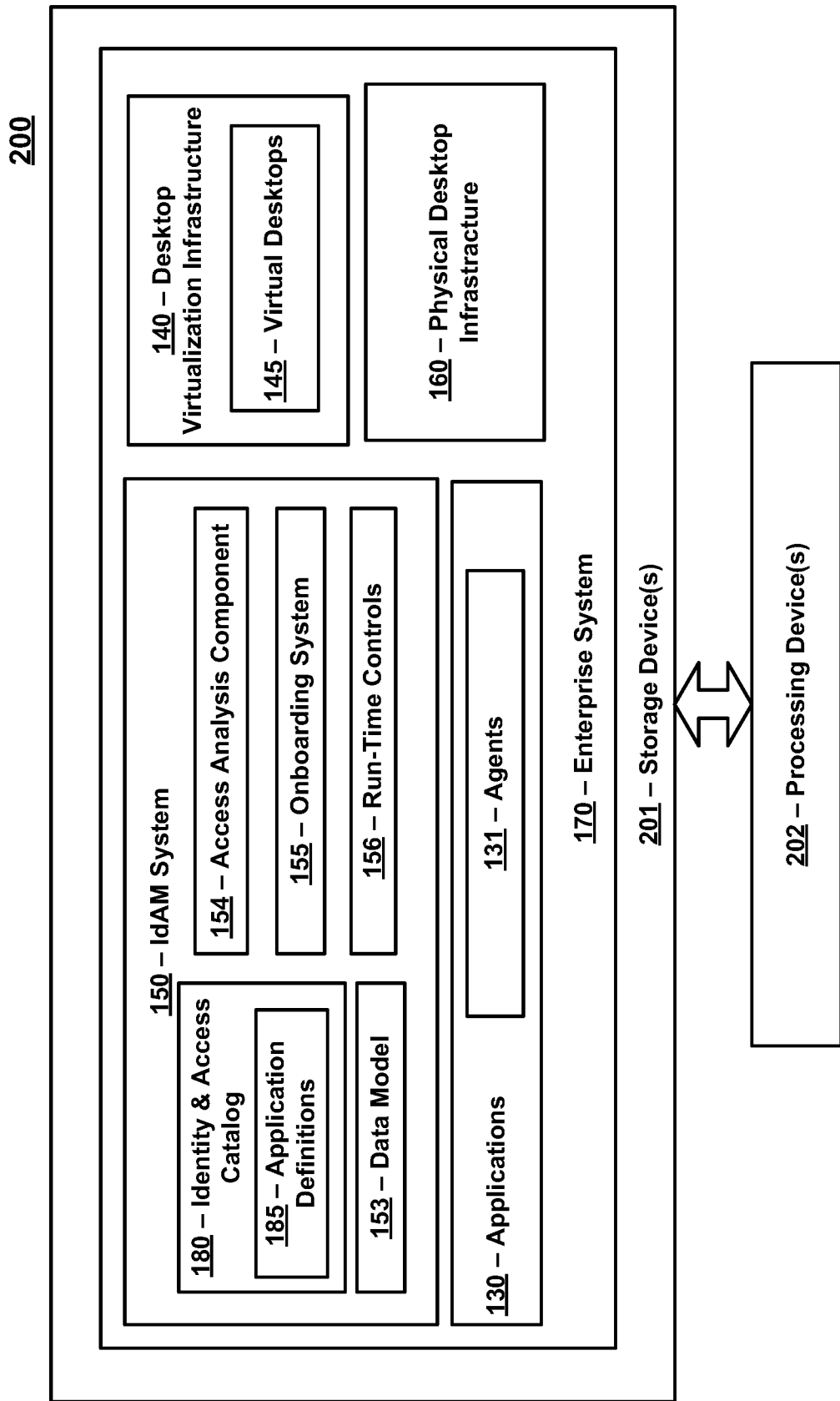
FIG. 1B is a block diagram of an enterprise system that includes an IdAM system in accordance with certain embodiments.

FIG. 1A is a block diagram of an exemplary system 100 according to certain embodiments. FIG. 1B is a block diagram of an enterprise system 170 that includes an IdAM system 150 according to certain embodiments.

The system 100 comprises one or more computing devices 110 and one or more servers 120 that are in communication over a network 190. An enterprise system 170 is stored on, and executed by, the one or more servers 120. The enterprise system 170 can include, inter alia, one or more applications 130, an identity and access management (IdAM) system 150, a desktop virtualization infrastructure 140, and a physical desktop infrastructure 170. The IdAM system 150 can include, inter alia, one or more data models 153, an access analysis component 154, an onboarding system 155, run-time controls 156, and/or one or more identify and access catalogs.

The network 190 may represent any type of communication network, e.g., such as one that comprises the Internet, a private intranet, a virtual private network (VPN), a local area network (e.g., a Wi-Fi network), a personal area network (e.g., a Bluetooth network), a wide area network, an intranet, a cellular network, a television network, and/or other types of networks. The system 100 may include any number of computing devices 110, servers 120, enterprise systems 170, and/or IdAM systems 150.

All the components illustrated in FIG. 1A, including the computing devices 110, servers 120, IdAM system 150 and/or enterprise system 170 can be configured to communicate directly with each other and/or over the network 190 via wired or wireless communication links, or a combination of the two. Each of the computing devices 110, servers 120, IdAM system 150, and enterprise system 170 can also be equipped with one or more transceiver devices, one or more computer storage devices 201 (e.g., RAM, ROM, PROM, SRAM, etc.), and one or more processing devices 202 that are capable of executing computer program instructions.

The one or more processing devices 202 (FIG. 1B) may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices 201 (FIG. 1B) can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, wearable devices, and/or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that are configured to communicate with the computing devices 110 and/or other applications and devices over the network 190 (e.g., over a private intranet, enterprise network, company network, and/or the Internet in some scenarios).

The enterprise system 170 may include or represent any system or network that provides one or more applications 130 and/or one or more resources to users. In certain embodiments, the enterprise system 170 can be affiliated with, or provided by, a company, business, enterprise, and/or individual. In certain embodiments, the enterprise system 170 can represent a private system and/or private network that provides various types of enterprise users (e.g., employees, managers, security teams, customers, and/or other users) with access to applications and other resources over a network 190.

The IdAM system 150 included in the enterprise system 170 can be configured to perform functions associated with integrating or onboarding applications 130 and/or other resources with the enterprise system 170. The IdAM system 150 also can be configured to define, establish, and/or promulgate access privileges that allocate appropriate permissions to users with respect to accessing the applications 130 and/or resources. The IdAM system 150 also can be configured to digitally identify, authenticate, and authorize users who are attempting to access applications and/or resources, and enforce the access privileges pertaining to the applications 130 and/or resources during run-time. For example, in certain embodiments, the IdAM system 150 can represent an overlay and/or central controller that controls access to applications 130 that are onboarded into the system. Additionally, or alternatively, the IdAM system 150 can communicate the application definitions and/or other information to a separate application (e.g., such as an IGA application or system), which performs these and/or other related functions.

In certain embodiments, the IdAM system 150 includes an onboarding system 155 that can be configured to provide functions for onboarding applications 130 for users of the enterprise system 170. Amongst other things, the onboarding system 155 can create an identity and access catalog 180 that stores application definitions 185 for each of the applications 130 that are onboarded into the enterprise system 170.

For example, for each application 130, an application definition 185 can specify application descriptors (e.g., application name, manufacturer, version, etc.), access privileges or entitlements (e.g., indicating which users can access the application 130 and/or particular features of the application 130), entitlement profiles (e.g., profiles that may be associated with particular access privileges, permissions, and/or entitlements), approval and provisioning workflows (e.g., indicating individuals and rules for approving and provisioning access requests), and/or recertification parameters (e.g., identifying rules and individuals for certifying application compliance with security and regulatory policies). As explained further below, the application definitions 185 can include other information and data as well.

In certain embodiments, the application definitions 185 also may include information that can be used to link or associate each application 130 to one or more activity feeds (e.g., event feeds indicating unauthorized access provision, attempts, and/or access requests). After an application 130 is onboarded into the IdAM system 150, the IdAM system 150 and/or other component can utilize the utilize the linked event feeds to detect unauthorized access attempts, requests to approve permissions for users (e.g., new users or employees), requests to remove permissions for users (e.g., old users who have exited the company), and/or other related events. As explained in further detail below, the IdAM system 150 also can include run-time controls 156 that enable various actions (e.g., approve requests, deny requests, revoke privileges, transmit notifications, etc.) to be taken automatically and/or manually in response to receiving the detected events.

The onboarding system 155 can enable large numbers of applications 130 to be onboarded into the enterprise system 170 quickly and securely. In some scenarios, the onboarding system 155 can be used to update a legacy enterprise system, and to onboard legacy applications and other applications into an updated enterprise system (e.g., which, in some cases, may include a private cloud-based system that uses identify and access management software). The onboarding system 155 can be used to securely and easily onboard and integrate applications 130 in other scenarios as well.

In certain embodiments, for each application 130, the onboarding system 155 permits a user to generate and customize an application definition 185, at least in part, using template-driven GUIs. For example, the template-driven GUIs can be used to gather any of the information that is incorporated into an application definition 185, such as parameters indicating who can search for and/or access the application 130, entitlement profiles and permissions associated with accessing the application 130, approval and provisioning workflows for the application 130, recertification parameters, and/or other features and parameters associated with the application 130. The template-driven GUIs may include input fields for collecting these and other parameters, and the data collected via the template-driven GUIs for an application definition 185 can be stored in the identity and access catalog 180.

Network security personnel and/or other users can access or view the identity and access catalog 180 (and application definitions 185 associated with the applications 130) to ensure appropriate security and access protocols are implemented, and to ensure the applications 130 are compliant with security, regulatory and auditing requirements. The users also can utilize the IdAM system 150 to update and/or modify the application definitions 185 as desired (e.g., to add/edit/revoke permissions, add/edit/delete profiles, add/edit/delete recertification settings, add/edit/delete approval and provisioning workflows, etc.).

In certain embodiments, the IdAM system 150 and/or onboarding system 155 can store a data model 153 that provides an abstraction for defining the application definitions 185, including the corresponding security parameters and access control parameters pertaining to the applications 130. The data model 153 serves to normalize the parameters across all of the applications 130, and permits the applications 130 to be onboarded without requiring any modifications (or minimal modifications) to the source codes of the applications 130. For each application 130 that is onboarded into the enterprise system 170, the data model 153 permits the parameters collected via the onboarding system 155 to be stored in a consistent, uniform format within an application definition 185. Furthermore, storing the underlying parameters of the applications 130 in this uniform format permits the parameters to be easily viewed, accessed, and/or updated (e.g., on one or more GUIs) using the IdAM system 150.

The IdAM system 150 and/or onboarding system 155 can be utilized to onboard any type of application 130 into the enterprise system 170. The functions provided or performed by the applications 130 can vary significantly. In some examples, the applications 130 may provide file storage services and functions, social networking services and functions, e-mail services and functions, document processing services and functions, data hosting services and functions, enterprise business services and functions, project collaboration services and functions, financial services and functions, legal services and functions, and many other types of services and functions.

In certain embodiments, the applications 130 integrated into the enterprise system 170 may include one or more software-as-a-service (SaaS) applications. In certain embodiments, the SaaS applications, and/or other remote-based applications, can be stored in a cloud-based system which can be accessed by the computing devices 110 operated by the users. For example, in some cases, one or more of the applications 130 and/or SaaS applications can be stored in a private cloud, and the computing devices 110 associated with an organization or enterprise can access and utilize the applications 130 over the network 190. Additionally, or alternatively, one or more of the applications 130 can be stored in a public cloud, and can be accessed and utilized by the computing devices 110 over the network 190. The applications 130 integrated into the enterprise system 170 also may include one or more local applications (e.g., applications 130 installed locally on the computing devices 110).

The IdAM system 150 may itself be implemented as a SaaS application, remotely accessed application, and/or a local application. Regardless of how the IdAM system 150 is implemented, the IdAM system 150 can prohibit access, limit access, control access, and/or facilitate access to any type of application 130 that is integrated into the enterprise system 170 based on the security, identification, and/or access control parameters stored in the access catalog 180 (and/or corresponding application definition 185 for the application 130).

In certain embodiments, the enterprise system 170 may provide a desktop virtualization infrastructure 140 that provides virtual desktops 145 to computing devices 110 over the network 190. In the desktop virtualization infrastructure 140, the servers 120 may execute separate virtual machines to provide each user with a virtual desktop 145 that can be accessed remotely. Users (e.g., employees, managers, and/or other users) can access the applications 130 via the virtual desktops 145 provided by the desktop virtualization infrastructure 140. The IdAM system 150 can prohibit access, limit access, control access, and/or facilitate access to the applications 130 in the desktop virtualization infrastructure 140 based on the security, identification, and/or access control parameters stored in the access catalog 180 (and corresponding application definitions 185). In some cases, this may include configuring end-user portals (e.g., client portals displayed on the computing devices 110), virtual desktops 145, and/or virtual machines for each user with appropriate permissions and entitlements based on the settings in the access catalog 180 and/or corresponding application definitions 185.

Additionally, or alternatively, the enterprise system 170 may provide a physical desktop infrastructure 160 in which one or more of the applications are stored locally on the computing devices 110. Users (e.g., employees, managers, and/or other users) can access the applications 130 directly on the computing devices 110. The IdAM system 150 can prohibit access, limit access, control access, and/or facilitate access to the applications 130 in such physical desktop infrastructure 140 based on the security, identification, and/or access control parameters stored in the access catalog 180 (and corresponding application definitions 185). In some cases, this may include pre-configuring the applications 130 for each user with appropriate permissions and entitlements based on the settings in the access catalog 180 and/or corresponding application definitions 185 and/or dynamically configuring the applications 130 for each user with appropriate permissions and entitlements when the applications 130 are executed.

In certain embodiments, the IdAM system 150 can be configured to monitor activity feeds to ensure security and regulatory protections specified in the access catalog 180 and/or corresponding application definitions 185 are being implemented on the network 190.

In certain embodiments, the IdAM system 150 also can include an access analysis component 154. Amongst other things, the access analysis component 154 can be utilized to integrate applications (e.g., legacy applications) into the enterprise network in manner that enables monitoring and enforcement of access rights and privileges. The access analysis component 154 also can be configured to perform functions associated with identifying or evaluating the risk that each application 130 poses with respect to enabling unauthorized access to the applications 130, particular functionalities associated with the applications 130, and/or other resources. The access analysis component 154 can enable the IdAM system 150 and/or other component (e.g., an IGA system) to eliminate, or at least, mitigate those risks.

In certain embodiments, the access analysis component 154 can execute functions that enable the access analysis component 154 to generate or determine access models (e.g., access models 450 in FIG. 4) for legacy applications and/or other applications that can be difficult to integrate with more modern enterprise systems. As explained in further detail below, understanding or determining an access model for a legacy application can be a technical challenge due, at least in part, to the fact that the entitlements, access rights and privileges of certain authorization codes associated with these applications may be unknown and difficult to discern.

The access analysis component 154 can collect information from various sources to determine the entitlements, access rights and privileges associated with authorization codes that are utilized by the applications, and understand the access models provided by the applications. The access analysis component 154 can include a crowding sourcing component to assist with collecting at least a portion of the information. The crowdsourcing component can configured to collect feedback from various users to predict or determine privileges and/or access rights associated with the applications 130 and corresponding authorization codes. The access analysis component 154 may further include a machine analysis component that analyzes the collected information and generates risk models associated with the applications 130. After the access models for the applications are discerned, the applications can be interfaced with the IdAM system 150 and/or an IGA system, thereby permitting monitoring and enforcement of access rights and privileges on the applications 130.

Any of the data collected by the access analysis component 154 can be stored in application definitions 185 for corresponding applications 130 in accordance with the data model 153. Additional details of the access analysis component 154 are described in further detail below.

In certain embodiments, the applications 130 can include, or be configured with, agents 131 (FIG. 1B) that assist with collecting information useful for determining the access models (and/or observing access usage) associated with the applications 130. The agents 131 can represent software code (e.g., programs, snippets, sub-routines, or the like) that is incorporated into the applications 130 to communicate information to the IdAM system 150. In some cases, the agents 131 can operate in the background of the applications 130 to monitor and collect information pertaining to the access models of the applications 130. Amongst other things, the agents 131 can dynamically track and monitor all user access event activities (e.g., indicating the features of the application are accessed, the authorization codes that were used to access the application and/or features of the application, etc.). The agents 131 can transmit the collected information to the IdAM system 150 to assist the IdAM system 150 with discerning the access models. Generally speaking, the agents 131 can transmit any information described herein that is obtained directly from the applications themselves (e.g., such as user access data, user access events, authorization codes, user group information, and inherent access rules described below). While access models across the applications 130 can vary, the agents 131 can transmit information to the IdAM system 150 in a uniform manner or normalized format, which can enable the IdAM 150 to interpret the received information.

As evidenced by the disclosure the herein, the configuration, features and functionality of the IdAM system 150 can vary. For example, the manner in which the IdAM system 150 determines application definitions and/or access models for applications can vary. In some cases, the application definitions and/or access models can be determined using automated or semi-automated techniques (e.g., which can involve the use of crowdsourcing components, machine analysis components, agents, etc.), template-driven GUIs, and/or a combination of both. Similarly, the manner in which the application definitions and/or access models are utilized to enforce workflows, rights, and privileges (e.g., associated with provisioning and de-provisioning users, enforcing segregation of duties, implementing user role management, etc.) can vary. In some cases, these functions may be performed by the IdAM system 150, an IGA system, and/or a combination of both. Exemplary details and embodiments of these configurations, features and functionalities are described below. Any aspect or feature that is described for one embodiment can be incorporated into and/or combined with any other embodiment mentioned in this disclosure.

Figure 2:
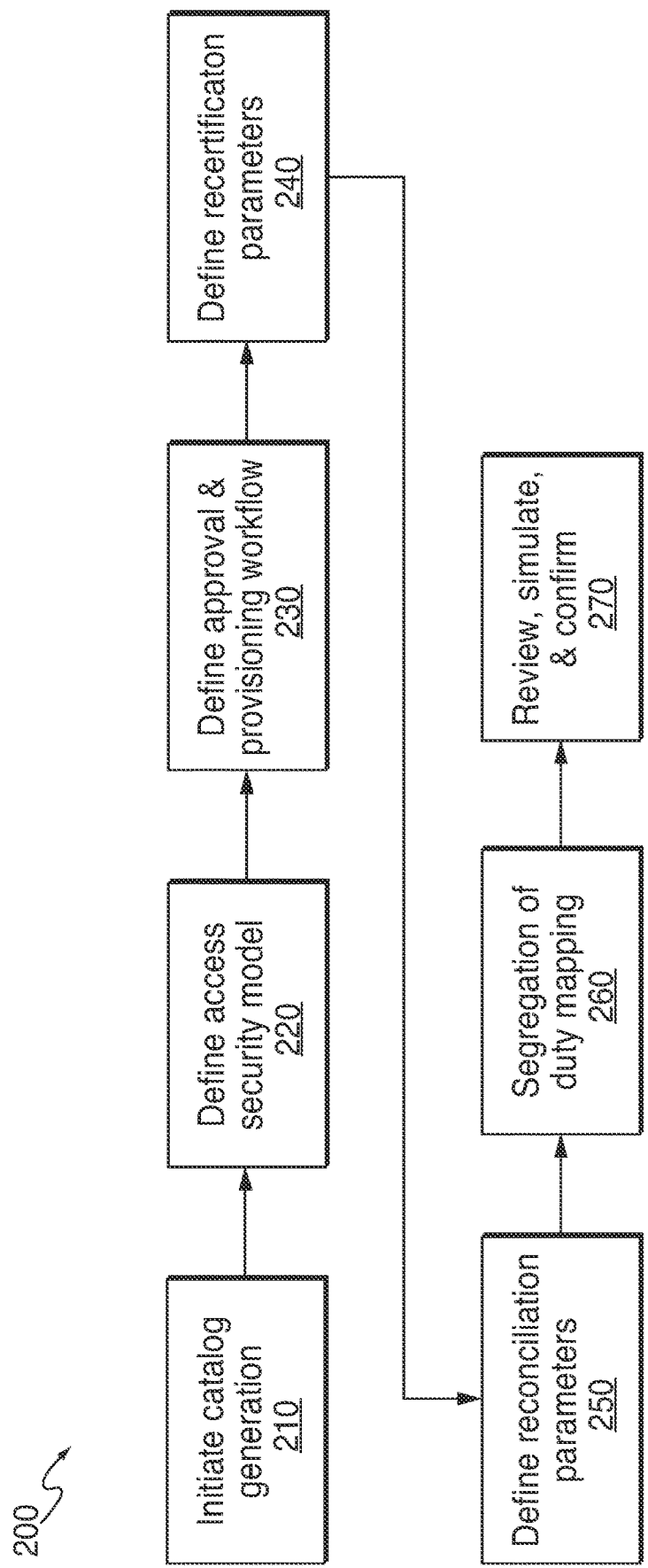
FIG. 2 is a flow diagram of an exemplary process in accordance with certain embodiments.

FIG. 2 is a flow diagram illustrating an exemplary process flow 200 for an onboarding system 155 according to certain embodiments. In certain embodiments, the onboarding system 155, IdAM system 150, and/or one or more servers 120 can include one or more storage modules that store instructions for implementing the functions described in the process flow 200. In some embodiments, the functions of the process flow 200 can be performed in the order presented. In other embodiments, the functions of process flow 200 can be performed in any suitable order. In still other embodiments, one or more of the functions of process flow 200 can be combined or skipped.

In certain embodiments, the onboarding system 155 and/or IdAM system 150 can be configured to present one or more graphical user interfaces (GUIs) for facilitating the functions associated with blocks 210-270. In certain embodiments, the onboarding system 155 and/or IdAM system 150 can present one or more separate templates to collect the data associated with each of blocks 210-270.

In block 210, an application definition 185 is initiated for a new application 130 that is being onboarded. In certain embodiments, an administrator user (e.g., a department manager, IT person, and/or other user who is onboarding an application) is presented with a GUI that enables the administrator user to define application definition parameters indicating which users (e.g., employees, managers, etc.) can access and/or search for the application 130. The administrator user also can select restriction criteria, which restricts groups of users from accessing the application 130 based on geographic location (e.g., state and/or country), company department (e.g., sales, accounting, legal, and/or other departments in an organization), and/or other filtering conditions.

In certain embodiments, the GUI receives the following inputs from the administrator user: 1) an application name; 2) parameters indicating which users can access and/or search for the application 130; and/or 3) keywords associated with the application 130 (e.g., keywords that permit the application 130 to be identified via searches). Upon receiving the inputs, a new application definition 185 can be initiated or created for the application 130. After the application 130 is onboarded and deployed, the end-user portals utilized by users to access applications 130 can be automatically configured with appropriate permissions and/or restrictions based on the input parameters (e.g., to enable certain users to access the application 130 and/or to prohibit other users from accessing the application 130).

In block 220, a GUI may permit the administrator user to define an access security model, which may include creating entitlements (e.g., access privileges and restrictions) and associating the entitlements with one or more entitlement profiles. The access security model, entitlement profiles, and/or entitlements may be stored in the application definition 185 associated with the application 130.

Entitlement profiles can be designed for specific users in some cases (e.g., in scenarios in which a limited number of users access the enterprise system 170). Alternatively, or additionally, entitlement profiles can be created for groups of users. In one example, entitlement profiles can be created for employees, managers, and network administrators. In another example, entitlement profiles can be created for users in separate departments (e.g., sales, accounting, marketing, legal, etc.). Regardless of how the entitlement profiles are designed, each profile can be associated with a set of entitlements that define restrictions and/or permissions applicable to the users associated with the entitlement profile.

In certain embodiments, the GUI receives the following inputs from the administrator user: 1) a profile name for each entitlement profile created; 2) a permission list for each of the profiles created; and/or 3) a permission names for each permission (and/or for each permission include the lists).

Examples of permissions that can be associated with an entitlement profile can indicate any or all of the following: whether or not a user can access the application 130; whether or not a user can access each of a plurality of features and/or functions provided by the application 130; whether or not a user can read or view data associated with an application 130; whether or not users can create, edit, and/or modify the data associated with an application 130; and/or whether or not users can delete data associated with the application 130. Other types of permissions and restrictions also be with the entitlement profiles.

The entitlement profiles and corresponding entitlements defined by the inputs may be stored in the application definition 185 for the application 130 and can be displayed on the GUI to the administrator user. After the application 130 is onboarded and deployed, the end user portals provided to the users to access the network 190 and/or application 130 can be configured with appropriate permissions and restrictions based on the entitlement profiles associated with the users.

As explained in further detail below, in certain embodiments, the functions in block 220 (associated with determining the access model, user access events, entitlement profiles, entitlements, privileges, etc.) may be alternatively, or additionally, be performed by the access analysis component 154 using automated or semi-automated techniques described herein.

In block 230, the administrator user defines approval and provisioning workflows for the application 130. For example, one or more GUIs may permit the administrator user to define an approval workflow that designates specific users (e.g., managers, department heads, and/or security personnel) who are able to approve and restrict requests for accessing the application 130 (and/or requests for specific entitlements) after the application 130 is deployed on the enterprise system 170. The one or more GUIs also may permit a user to define a provisioning workflow that designates specific users (e.g., security personnel and/or IT personnel) who will actually provision or deliver the permissions (or restrictions) to users. In certain embodiments, the one or more GUIs also may permit the user to design forms (or select pre-defined forms) that can permit users to request access to applications (or particular application features) and forms that permit designated users approve or deny such requests.

In certain embodiments, the GUI receives the following inputs from the user: 1) inputs and/or logic defining the approval workflow; 2) inputs and/or logic defining the provisioning workflow; and/or 3) inputs for designing or selecting the forms. The data describing the approval and provisioning workflows may be stored in the application definition 185 for the application 130. After the application 130 is onboarded and deployed on the enterprise system 170, the end user portals utilized to access the application 130 and/or network 190 can be configured with the approval workflows and/or provisioning workflows.

In block 240, the administrator user specifies parameters associated with recertifying the application 130 on a periodic basis (e.g., on a quarterly or annual basis). For example, in some scenarios, the application 130 being onboarded may be subject to recertification to confirm the application is compliant with internal security policies and/or regulatory policies. Thus, a GUI may enable a user to specify or designate one or more users (e.g., managers, department heads, and/or other individuals) who are responsible for recertifying the application 130, and to identify the entitlement profiles that are within the scope of recertification.

After the application 130 is onboarded and/or deployed, the designated users may access the application definition 185 to assist with recertifying the application 130. In some cases, recertifying the application 130 can involve ensuring that the entitlement profiles are appropriately associated with the correct set of users, ensuring access to the application 130 was removed for users who have departed the organization associated with the enterprise system 170, ensuring unauthorized access attempts are eliminated (e.g., using the activity feed described below in the description of block 250), and/or ensuring other security policies are being followed.

In certain embodiments, the GUI receives the following inputs from the user: 1) designations indicating which entitlement profiles for the application 130 are subject to recertification; 2) designations indicating which entitlement profiles are exempt from recertification; and/or 3) designations identifying specific users who are responsible for recertifying each of the entitlement profiles to be certified. The parameters for recertifying the application 130 may be stored in the application definition 185 for the application 130.

In block 250, the administrator user specifies reconciliation parameters that can be used to identify unauthorized access provision and/or attempts pertaining to the application 130 after the application is onboarded and deployed on the enterprise system 170. In certain embodiments, after the application 130 is able to accessed by users of the enterprise system 170, the IdAM system 150 (or other component, such as the IGA system described below) can utilize run-time controls 156 to monitor an activity feed that comprises activity events pertaining to the application 130 (e.g., activity events pertaining to access attempts, attempts pertaining to read/write/delete/update data associated with the application 130, etc.). Any unauthorized activity events can be detected by the IdAM system 150 and reported to one or more users (e.g., reported via notifications and/or daily summaries of events to recertification users, security personnel, or other users).

In certain embodiments, the GUI receives the inputs for defining the reconciliation parameters including: 1) an activity feed definition (e.g., which may identify what constitutes an unauthorized activity event and/or access attempt); 2) a feed schedule (e.g., which may indicate when reports on the activity feed are provided); and 3) feed credentials (e.g., indicating which users can access the activity feed and/or reports). The reconciliation parameters may be stored in the application definition 185 for the application 130.

In block 260, a user specifies segregation of duty (SoD) parameters that can be used to provide an additional layer of security for identifying unauthorized access attempts. As mentioned above, the entitlements associated with entitlement profiles and other settings stored in the application definition 815 can be utilized to prevent unauthorized access attempts for the application 130. The segregation of duty (SoD) parameters can be utilized to define and/or map access-related rules to each of the entitlement profiles associated with the application 130. The rules can be used to identify and/or prevent unauthorized access attempts. The user onboarding the application 130 can utilize one or more GUIs to specify and map the rules to each of the entitlement profiles, and the SoD parameters can be stored in the application definition 185 associated with the application 130.

To illustrate by way of example, consider a scenario in which an entitlement profile is only intended to be able to read or view, but not modify or edit, the data associated with the application 130. In this scenario, the administrator user may specify a rule that detects when users associated with the entitlement profile attempt to modify or edit data associated with the application 130. The administrator user also may define a rule that explicitly prevents and prohibits users associated with the entitlement profile from modifying or editing the data associated with the application 130. Thus, in the event that the entitlements associated with the entitlement profile fail to prohibit users from modifying or editing data in some instances (e.g., due to updates to the application code and/or additional features being added), the rules associated with the SoD parameters can be utilized to prevent this type of unauthorized access to the application 130.

In block 270, the administrator user is provided with a GUI that enables the user to review all of the data selections and inputs provided in the previous onboarding stages, edit any desired selections and inputs, and confirm the accuracy of the application definition 185 and/or settings associated with the application 130.

In certain embodiments, before the administrator user confirms the application definition 185 and/or settings associated with the application 130, the administrator user can select a simulation option that generates a simulation of the application 130 based on the application definition 185 and/or settings associated with the application 130. For example, the administrator user may be permitted to execute a simulation in which a simulated end-user portal attempts to access the application 130 based on each of the entitlement profiles associated with the application 130. For instance, given a scenario in which separate entitlement profiles have been created for marketing users and sales users, the simulation option can permit a user to execute a simulated end-user portal under each of the entitlement profiles. These simulations can be used to validate the configurations of the application definition 185 before the application 130 is deployed.

After the user confirms the application definition 185 and/or settings associated with the application 130, the onboarding process is completed and, in some cases, the application 130 can be deployed or made available via the enterprise system 170.

After an application 130 is onboarded and deployed, the IdAM system 150 (or IGA system described below) can provide a user various run-time controls 156 for managing, monitoring, and controlling access to applications including, but not limited to the run-time controls 156 mentioned below.

1) New Joiner Controls—controls that can be used to delegate and/or approve access for users (e.g., new users or users that require modified access privileges).
2) Mover Controls—controls that can be used to revoke previous access permissions, and delegate or approve new access privileges, for users (e.g., in the event users switch departments and/or users are promoted to positions with greater access privileges).
3) Leaver Controls—controls that can be used to revoke access for users who are no longer employed by, or associated with, a provider of the enterprise system 170.
4) Certification Controls—controls for certifying or recertifying existing access configurations on a periodic basis (e.g., annually or quarterly).
5) Preventative Controls—controls that prevent assignment of conflicting permissions that can be used to bypass unauthorized access.
6) Detective Controls—controls to identify and remediate settings that may permit unauthorized access by certain users.
7) Investigation Controls—control to investigate or search access configurations (e.g., to identify users who left the enterprise) and/or controls to investigate unauthorized access attempts.

8) Dormancy Controls—controls to identify users who have not accessed applications despite having access privileges, and controls for removing access for these users.
9) Breakglass Controls—controls to identify and remove access that was given temporarily to users (e.g., third-party users).
10) Privileged Access Controls—controls to enforce workflow approval for certain application resources.

Some or all of the aforementioned run-time controls 156 can be facilitated by GUIs presented via the IdAM system 150 and/or IGA system described herein.

Figure 3:
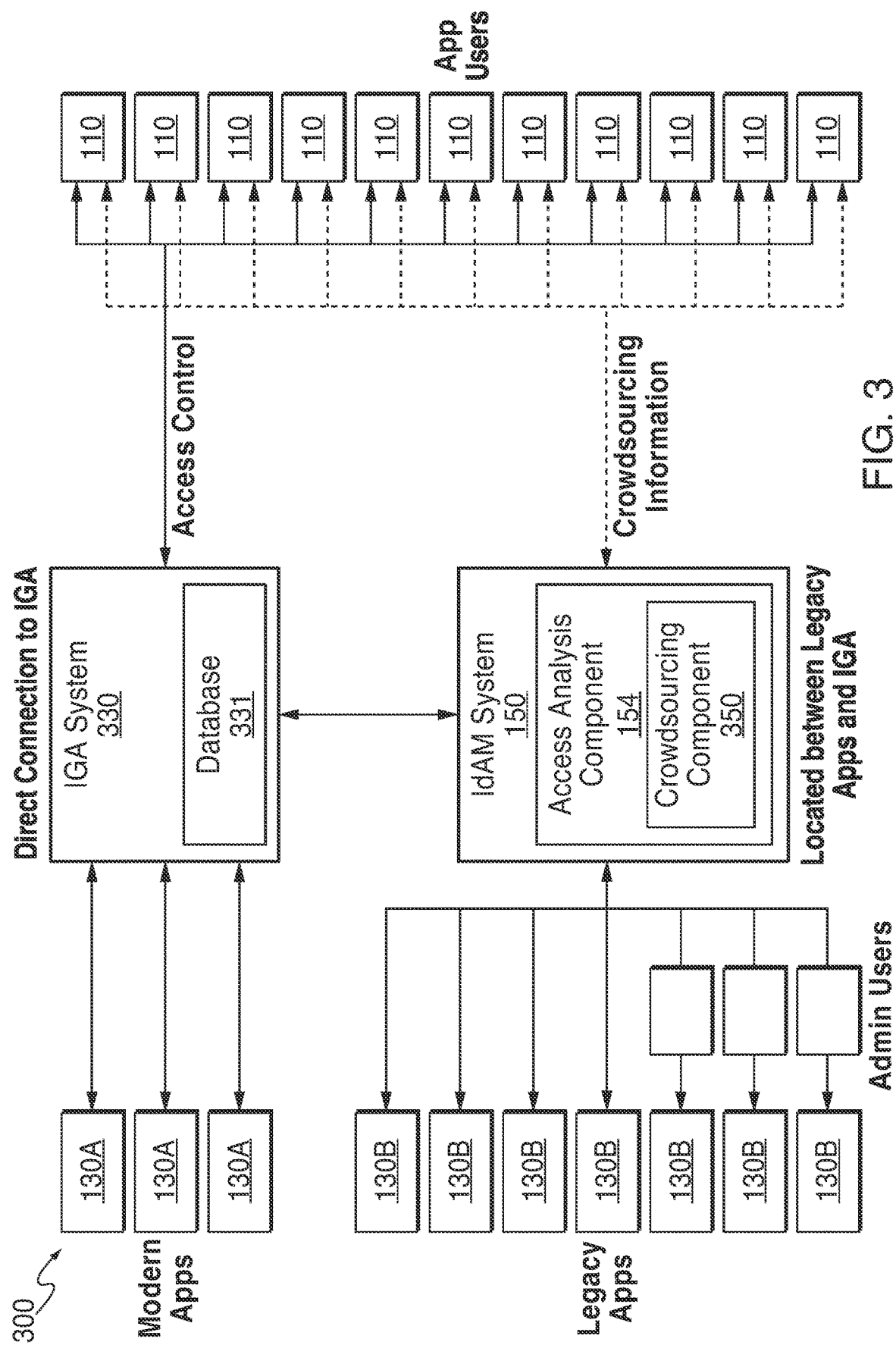
FIG. 3 is a block diagram illustrating an IdAM system that is in communication with an identity and governance administration (IGA) system according to certain embodiments.

FIG. 3 is a block diagram of an exemplary system 300 according to certain embodiments. In this exemplary system 300, the IdAM system 150 can be configured to execute functions that improve and enhance the functionality of an identity and governance administration (IGA) system 330 according to certain embodiments. Amongst other things, the functions executed by the IdAM system 150 permit a broader range of applications to be integrated with the IGA system 330.

The IGA system 330 can be stored on and executed by one or more servers 120. In some cases, the IGA system 330 may represent an application or platform that is separate from the IdAM system 150. Alternatively, the IGA system 330 and/or its associated functionality may be integrated with the IdAM system 150 and/or other component of the enterprise system 170. In the case of the later, the IdAM system 150 can execute any functionality of the IGA system 330 described herein.

The IGA system 330 can execute routines or applications that provide users (e.g., network administrators, security personnel, and/other individuals) with visibility into access rights and privileges on the network 190 and/or enterprise system 170. In some cases, the IGA system 330 can facilitate a policy-based, centralized orchestration of user identity management and access control. Amongst other things, the IGA system 330 can automate workflows for provisioning and de-provisioning users, enforcing segregation of duties, implementing user role management, managing access logs, and providing analytics and reporting (e.g., pertaining to unauthorized access provision or attempts, user access, applications, etc.).

In some embodiments, the IGA system 330 can store and maintain a database 331 that tracks user access with respect to the applications 130 made available via the enterprise system 170. For each user, the database 331 may store information that indicates whether or not the user has access to each of the applications 130. The database 331 also may store more granular information indicating whether each user is permitted to access or utilize particular features or functionalities provided by each of the applications 130. In some cases, the database 331 may store information that indicates whether each user can read, write, edit, and/or delete files and information associated with each of the applications 130. In some cases, users may be assigned to, or associated with, user groups that define the access rights and privileges, and the database 331 can store information associated with the user groups (e.g., information identifying the privileges of each user group and the users associated with each user group).

As mentioned above, the types of applications 130 made available via the enterprise system 170 can vary greatly. In some scenarios, the applications provided by the enterprise system 170 may include applications 130 associated with providing financial services (e.g., banking applications, security trading applications, financial portfolio management applications, retirement fund applications, investment applications, cryptocurrency wallet applications, etc.). The IGA system 330 may store information for each user that indicates whether the user is permitted to access each of the financial services applications and/or whether the user can access or utilize particular functionalities associated with each of the applications (e.g., whether the user can access bank accounts, post trades, make purchases, sell assets, view financial profiles and information, etc.). As mentioned above, in some cases, the users can be assigned to user groups or entitlement profiles that define the access privileges for a group of users with respect to accessing the financial services applications and their associated features.

The applications 130 made available via the enterprise system 170 can include both modern applications 130A and legacy applications 130B. Modern applications 130A can more easily be onboarded and integrated into enterprise systems 170 in comparison to legacy applications 130B. Modern applications 130A are often designed for usage or execution in cloud-based environments and may include application programming interfaces (APIs) that permit the IdAM system 150 and/or IGA system 330 to more easily obtain information that is utilized to create the application definitions 180 (e.g., such as the user groups, privileges, and entitlements for each application). Conversely, legacy applications 130B are typically created using older technologies, and they often lack compatibility with cloud-based environments and/or the aforementioned API functionality. As a result, it is more difficult to onboard legacy applications 130B and/or enforce access controls on legacy applications 130B.

Moreover, in recent years, there has been an effort by many organizations or providers of enterprise systems 170 to transition applications 130 to a cloud-based environment (e.g., a private cloud that is maintained by the organizations or providers) in which access control is enforced and implemented with an IGA system 330. Attempting to integrate legacy applications 130B into these modern, cloud-based systems has proved technically challenging for a variety of reasons. As mentioned above, many of the legacy applications 130B are not compatible with cloud-based systems. Additionally, the legacy applications 130B often are not able to be integrated with the IGA system 330 because the IGA system 330 is unable to access or interpret sufficient information that enables it to identify and enforce access rights on the legacy applications 130B. Because the legacy applications 130B are often created using outdated technologies, the underlying information associated with the legacy applications 130B is stored in a non-coherent manner (e.g., such that random authorization codes or identifiers are used to identify user groups or entitlement profiles with no indication of corresponding entitlements, privileges or access rights). Failure to integrate the legacy applications 130B with the IGA system 330 can be particularly problematic in scenarios where the enterprise system 170 provides access to sensitive information (e.g., financial services information, medical information, and/or legal information) that is subject to strict confidentiality and regulatory measures.

The IdAM system 150 can be configured to execute functions that overcome these and other technical challenges. As shown in FIG. 3, the IdAM system 150 can be strategically situated between the legacy applications 130B and the IGA system 330. Generally speaking, the access analysis component 154 of the IdAM system 150 can be configured to perform functions associated with understanding access models for the legacy applications 130B, and identifying or evaluating the risk that each application 130 poses with respect to allowing unauthorized access by the users. As explained in further detail below, the access analysis component 154 can collect the information that is used to determine access rights of users with respect to each of the legacy applications 130B, and can relay this information to the IGA system 330. In some embodiments, the information gathered by the access analysis component 154 can be utilized to create and/or supplement application definitions 185 corresponding to each of the legacy applications 130B. The application definitions 185 (or information included therein) can be utilized by the IGA system 330 to determine and enforce appropriate access rights and privileges for the users with respect to the legacy applications 130B.

As described in further detail below, access analysis component 154 can include a crowdsourcing component 350 that is configured to collect information from a variety of different individuals and/or sources. This information can be used, at least in part, to determine or predict an access model that identifies access rights and privileges for each of the users and/or user groups associated with the application. Once the access model of an application is determined, the application can be interfaced or integrated with the IGA system 330, and the IGA system 330 can then utilize the collected information to assign, determine, and/or enforce appropriate access rights and privileges on the users.

Figure 4:
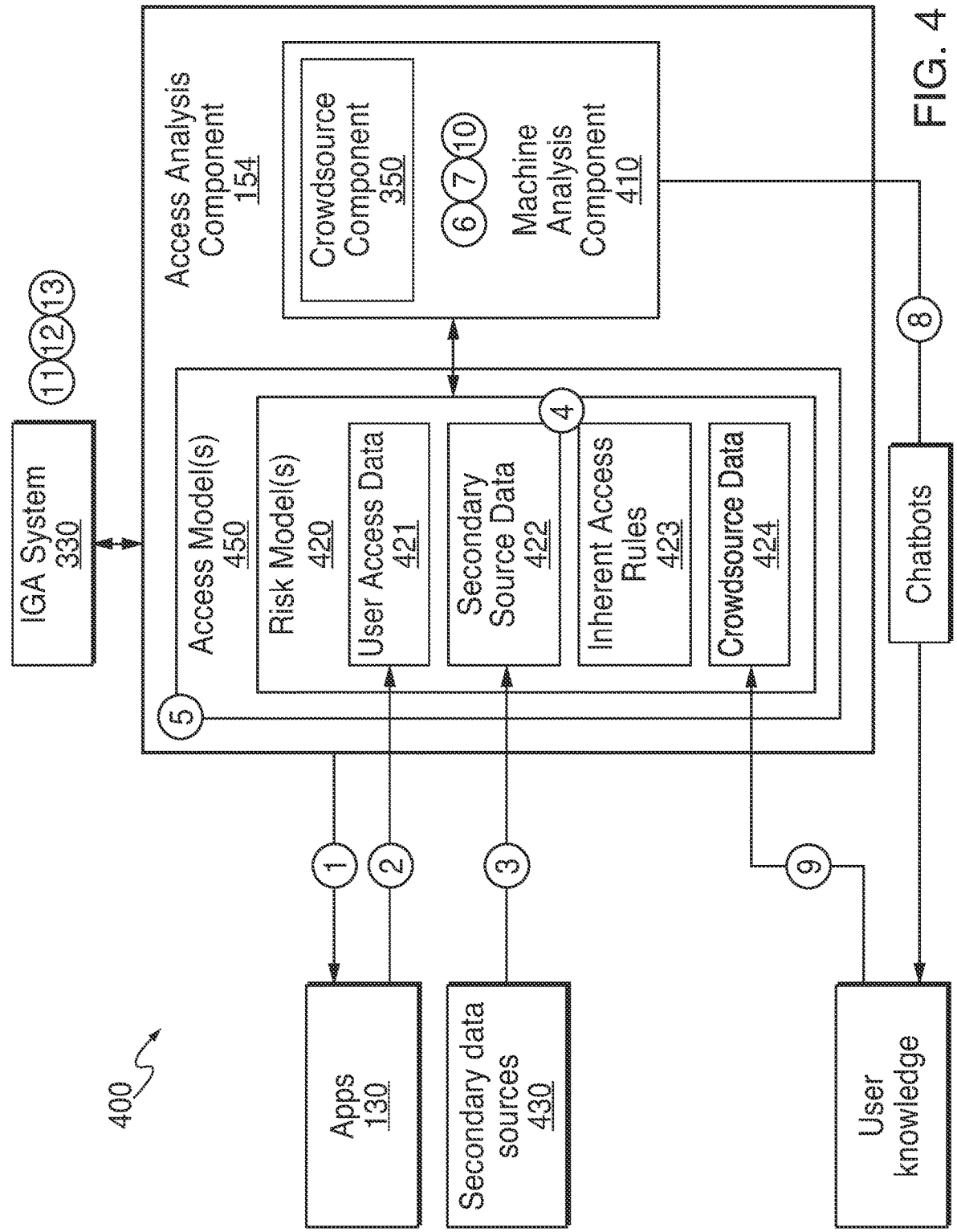
FIG. 4 is a flow diagram illustrating exemplary functions that can be executed by an access analysis component to integrate legacy applications or other application with an IGA system according to certain embodiments.

FIG. 4 is a flow diagram illustrating an exemplary process flow 400 according to certain embodiments. In certain embodiments, the access analysis component 154, IdAM system 150, and/or one or more servers 120 can include one or more storage modules that store instructions for implementing the functions described in the process flow 400. In some embodiments, the functions of the process flow 400 can be performed in the order presented. In other embodiments, the functions of process flow 400 can be performed in any suitable order. In still other embodiments, one or more of the functions of process flow 400 can be combined or skipped.

As shown in FIG. 4, the access analysis component 154 of the IdAM system 150 can be situated between the applications 130 (e.g., which may include legacy applications 130B) and the IGA system 330. The process described below with respect to steps 1-13 demonstrates how the access analysis component 154 can execute functions for collecting access and privilege information from an application 130 to derive an access model 450 for the application 130. The access model 450 can then be made accessible to the IGA system 330. Amongst other things, the access model 450 can enable the application 130 to be integrated with the IGA system 330. The IGA system 330 also can utilize the access model 450 to assign, determine, monitor, and/or enforce appropriate rights and privileges on users with respect to accessing the application 130. The same process can be repeated for each of a plurality of applications 130, and can be particularly useful to integrate legacy applications 130B with the IGA system 330.

As explained below, the access models 450 discerned by the access analysis component 154 can include various information associated with defining the access rights and privileges associated with the applications 130 made available through the enterprise system 170. In some cases, the data and information associated with the access models 450 can be stored as application definitions 185, and can include the same or similar information described above. The process described below can be executed to collect access right and privilege information for one or more applications 130 (e.g., legacy applications 130B) that are unable to be onboarded using the techniques described above (e.g., because the access model 450, and associated access rights and privileges, cannot be readily discerned or specified via GUI interfaces).

At step 1, a connection is established between the access analysis component 154 and an application 130 (e.g., a legacy application 130B) that is available via the enterprise system 170. The access analysis component 154 and application 130 can communicate with each other via this connection.

At step 2, the access analysis component 154 retrieves user access data 421 from the application 130 related to the application's access model. For example, in some scenarios, the user access data 421 collected from the application 130 may identify one or more user groups and/or one or more authorization codes, each of which is associated with a set of entitlements that can indicate access rights, privileges, and/or permissions. In some cases, each of the user groups and/or authorization codes may be associated with an entitlement profile that defines the associated access rights, privileges, and/or permissions. For scenarios in which the access analysis component 154 is gathering information from a legacy application 130B, the data gathered at this step is typically insufficient to determine the particular access rights, privileges, and/or permissions that are associated with each user group. Additional data may be needed to integrate the legacy application 130B with the IGA system 330.

At step 3, the access analysis component 154 supplements the user access data 421 ascertained directly from the application 130 itself with secondary source data 422, which can be obtained from one or more secondary sources 430. In some cases, the secondary source data 422 can be obtained from various databases (e.g., network activity databases, IdAM databases, IT databases, HR databases, etc.) within the enterprise system 170, such as databases that are external to the application 130 itself. The secondary source data 422 can include additional information that provides insight into the access model 435 associated with the application 130. For example, the secondary source data 422 can include one or more of the following:

1) data associated with user access requests (e.g., indicating approvals and/or denials by administrators or other individuals to provide users with access to the application 130 and/or particular features of the application 130);
2) data associated with authentication events relating to the application (e.g., indicating when the users have successfully logged in or accessed the application and/or particular features made available via the application);
3) data indicating usage activity of the application 130 by one or more users; and/or
4) personnel or HR (human resources) information (e.g., information identifying the users and their corresponding login information, as well as their employment status).

Amongst other things, the access analysis component 154 can analyze and/or utilize the secondary source data 422 to glean additional details relating to which users (or user groups) have access to the application 130 and/or particular features associated with the application 130.

At step 4, the access analysis component 420 identifies and/or derives inherent access rules 423 associated with the application 130. The inherent access rules 423 can include information or data that indicates the underlying authorizations, rules or procedures utilized by the application 130 to enforce individual access control (e.g., indicating the actions each user is authorized to perform once they have been authenticated and/or accessed the application 130). For example, in the context of an application that handles payment-related activities, exemplary inherent access rules 423 can pertain to authorizations or rules that control whether users may initiate payments, review payments, approve payments, and/or initiate refunds. In some cases, the inherent access rules 423 can be identified and/or derived by analyzing the user access data 421 and/or secondary source data 422.

At step 5, an access analysis component 420 generates an initial risk profile 420 for the application 130 based, at least in part, on the collected information (including the user access data 421, secondary source data 422, and/or inherent access rules 423). The user access data 421, secondary source data 422, and inherent access rules 423 may be stored in the risk model 420 and/or utilized to derived the risk model 420.

The risk model 420 can include information that identifies actual or potential risks associated with unauthorized access to the application 130. For example, the risk model 420 can identify unauthorized users or unauthorized user groups that have access (or potentially have access) to the application 130 and/or particular features of the application 130. In some cases, the risk model 420 can be used to identify users that appear to have excessive access rights and/or privileges. Additionally, or alternatively, the risk model 420 can identify risks that external users (e.g., former employees, hackers, and/or other users external to the enterprise system 170) pose with respect to accessing the application 130. In certain embodiments, the access analysis component 420 and/or machine analysis component 410 can analyze or utilize the user access data 421, secondary source data 422, and/or inherent access rules 423 to identify these inherent risks associated with the application's access model.

At step 6, a machine analysis component 410 initiates a data capture procedure to supplement the risk model 420 associated with the application 130 with additional information that can be used to assess access risks associated with the application 130 and/or gain a better insight into the access model 450 associated with the application 130. This data capture procedure is described in further detail below with respect to steps 7-10.

At step 7, the machine analysis component 410 divides or segments the users into one or more user groups. The machine analysis component 410 can assign users to user groups based, at least in part, on the information stored in the risk model 420 (e.g., the user access information 421, secondary source information 422, and/or inherent access rules 423). In certain embodiments, the information incorporated into the risk model 420 allows the machine analysis component 410 to determine or identify authorization codes that permit users to access the application 130 and/or particular features associated with the application 130. These authorization codes may be utilized to divide users into the user groups.

In many cases (especially in cases involving legacy applications 130B), it may be difficult or impossible to determine the rights and privileges that are provided by each of the authorization codes. However, the information in the risk model 420 can be sufficient to enable the machine analysis component 410 to determine the existence of the various authorization codes, as well as the authorization codes that are used by each of the users to access the application 130. The users can initially be divided into user groups based, at least in part, on the authorization codes.

Figure 5:
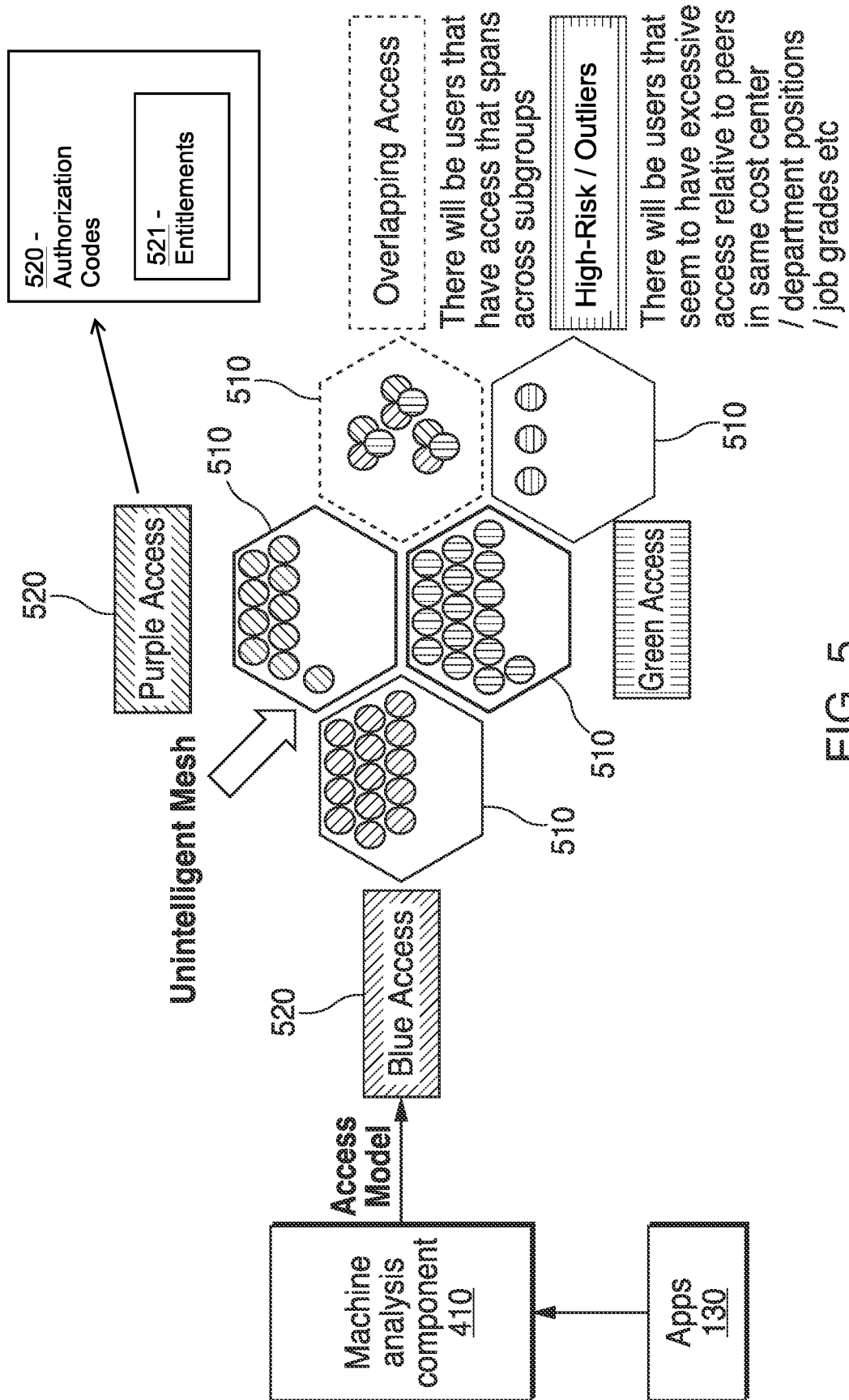
FIG. 5 is block diagram illustrating how a machine analysis component can determine user groups according to certain embodiments.

FIG. 5 is a diagram illustrating how the machine analysis component 420 can divide users into various user groups 510 based on authorization codes 520 associated with the users. Each of these authorization codes 520 may provide entitlements 521 (e.g., access privileges) to a user to perform certain actions and/or execute certain functions associated with the application 130. In some cases, each authorization code 520 may be associated an entitlement profile that specifies the access rights and privileges.

In this exemplary scenario, "blue access," "green access," and "purple access" each may represent or correspond to a cluster of authorization codes 520 (e.g., a cluster that is associated with one or multiple authorization codes 520). In many cases, the identified authorization codes 520 may be represented by random acronyms and/or alphanumeric sequences that identify or indicate entitlements 521 (e.g., privileges and/or access rights) of users, but the particular privileges or access rights provided by the authorization codes 520 may not be known.

Each user that is associated with a particular authorization code 520 or cluster of authorization codes 520 (e.g., capable of using the authorization codes 520 to access the application 130 and/or its functionalities) can be assigned to a user group 510 associated with the corresponding authorization code 520. Additionally, one or more additional user groups 510 can be used to identify users that have access to multiple clusters of authorization codes 520. For example, one user group may identify all users that have blue access, green access, and purple access (and can use corresponding authorization codes 520 to access an application's functionalities), and a second user group 510 may identify all users who have only blue and purple access. The machine analysis component 420 also may create a separate user group 510 to identify users that appear pose a security risk. For example, the user group 510 may include users that appear to have excessive access entitlements or privileges relative to other users (e.g., relative to other users in the same department and/or to other users having the same job, title, and/or security clearance). Each user can be assigned to one or more of the user groups 510 based on the user access information 421, secondary source information 422, and/or inherent access rules 423 included in the risk model 430.

Returning to FIG. 4, at step 8, a crowdsourcing component 350 initiates or establishes communications with one or more of the users. These communications can be used to solicit additional information directly from various users, which can be used to supplement the risk model 420 and/or gain insight on the access model 450 associated with the application 130.

The crowdsourcing component 350 can solicit information from various types of users. Generally speaking, the crowdsourcing component 350 can be utilized to communicate with any individual who can provide useful information associated with the application 130 and/or its corresponding access model. In many embodiments, the crowdsourcing component 350 can solicit information directly from end-users of the enterprise system 170 who utilize the application 130 in connection with business operations. Additionally, or alternatively, the crowdsourcing component 350 can solicit information from administrator users, such as network security and information technology (IT) personnel who assist with maintaining the network 190 and resources provided via the network 190. Additionally, or alternatively, the crowdsourcing component 350 can solicit information from application developers who create or maintain the application 130. The crowdsourcing component 350 can solicit information from other users as well.

The manner in which the crowdsourcing component 350 solicits information can vary. In certain embodiments, the crowdsourcing component 350 utilizes one or more chatbots to communicate with the users. For example, a chatbot may include software that is configured to simulate human-like conversations with the users to solicit information via a textual exchange (e.g., such via an instant messenger or text message). The crowdsourcing component 350 can additionally, or alternatively, utilize other forms of communication to solicit the information (e.g., web-based or GUI-based input forms, e-mails communications, automated phone calls, mobile phone text messages, etc.).

The type of information solicited by the crowdsourcing component 350 from the users can vary. In many cases, the crowdsourcing component 350 can solicit information from each user that indicates the privileges of the user with respect to accessing the application 130 and/or accessing various features of the application 130. For example, the crowdsourcing component 350 can request information indicating whether a user is able to access or utilize the application 130 and/or particular application modules of the application 130 (e.g., modules that perform particular functions and/or provide access to certain types of data), submit payments, view particular subsets of information, create/edit/delete content or files, and/or other types of access-related information. The crowdsourcing component 350 additionally can request information indicating the user's position (e.g., job title, departments, etc.), geographic location, usage activity, and business context in which the application is used. The crowdsourcing component 350 can solicit other types of information that can be useful for understanding the access model 450 associated with the application 130.

In certain embodiments, the machine analysis component 410 can execute a reliability assessment function to identify the users from whom information will be solicited using the crowdsourcing component 350. For example, the machine analysis component 410 can utilize the previously collected information to identify users who are likely to provide useful or accurate information with respect to the determining the access rights and privileges provided by the access model of the application 130. The crowdsourcing components can initiate communications with those users who are likely to provide useful or accurate information.

Figure 6:
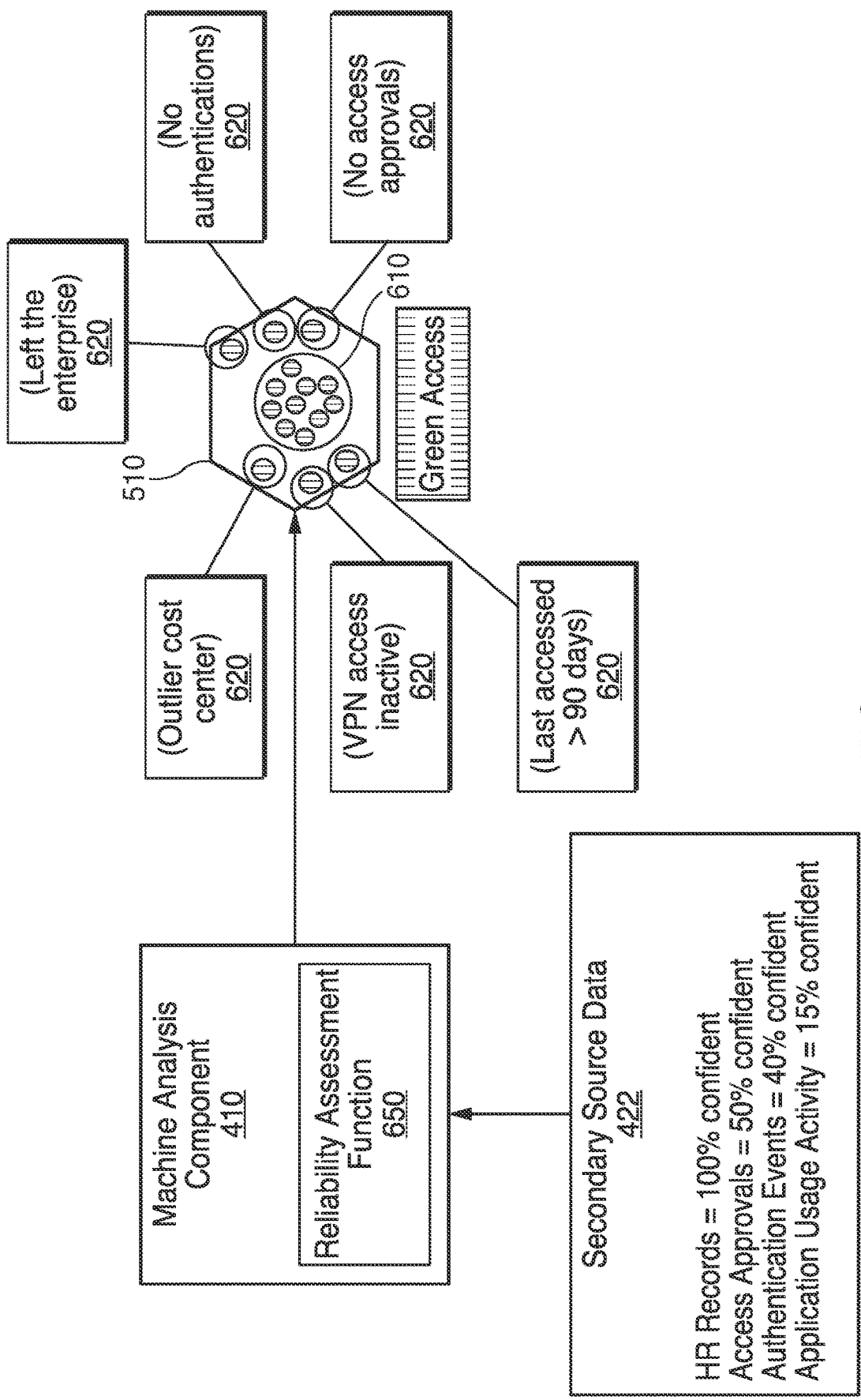
FIG. 6 is a block diagram illustrating how a machine analysis component can identify trusted users and non-trusted users according to certain embodiments.

FIG. 6 is a diagram illustrating an exemplary technique for executing a reliability assessment function 650 according to certain embodiments. For each user group 510, the machine analysis component 410 can analyze the collected information (e.g., including the user access data 421, secondary source data 422, inherent rules 423, and crowdsource data 424) to identify a subset of trusted users 610. Trusted users 610 may represent individuals or users who are likely capable of providing useful or accurate information with respect to the access rights and privileges associated with authorization codes 520, and/or with respect to the access model 450 of the application 130. The machine analysis component 410 also can analyze the collected information to identify non-trusted users 620. Non-trusted users 620 may represent individuals or users who are not likely to provide useful or accurate information that can be used to determine the access rights, privileges, and/or access model associated the application 130.

The manner in which the machine analysis component 410 identifies trusted users 610 and non-trusted users 620 can vary. In some cases, the machine analysis component 410 can evaluate various metrics included in the collected data to determine whether a user is a trusted user 610 or non-trusted user 620. For example, in some cases, any or all the following metrics may be used to determine whether a user is a trusted user 610 or non-trusted user 620:

1) HR information indicating an employment status of a user (e.g., indicating whether the user is currently employed or has left the enterprise);
2) authentication information (e.g., indicating whether the user has previously logged into, or accessed, the application 130 and/or enterprise network 190);
3) access approval information (e.g., indicating whether requests to access the application 130 were approved or denied by administrator users);
4) application usage activity (e.g., indicating how long the user has had access to the application 130 and/or whether the user accessed the application within a most previous time period, such as the previous ninety day time period);
5) virtual private network (VPN) information (e.g., indicating whether the user's VPN access on the network 190 is active or inactive);
6) seniority grade (e.g., indicating whether the user performs a senior role or junior role in enterprise and/or in the business department associated with the application 130); and/or
7) user type (e.g., indicating whether the user is a developer of the application, end-user of the enterprise system 170, network administrator, etc.).

The machine analysis component 410 can analyze these and/or other metrics to determine whether a user can provide reliable information in connection with assessing the access model of the application 130. As explained in further detail below, the machine analysis component 410 also can execute a scoring function that is configured to determine a confidence rating for each user that estimates the reliability of the crowdsource data 424 obtained from that user. In some cases, confidence ratings may only be generated for trusted users 610. In other embodiments, confidence ratings may be generated for both trusted users 610 and non-trusted users 620.

Figure 7:
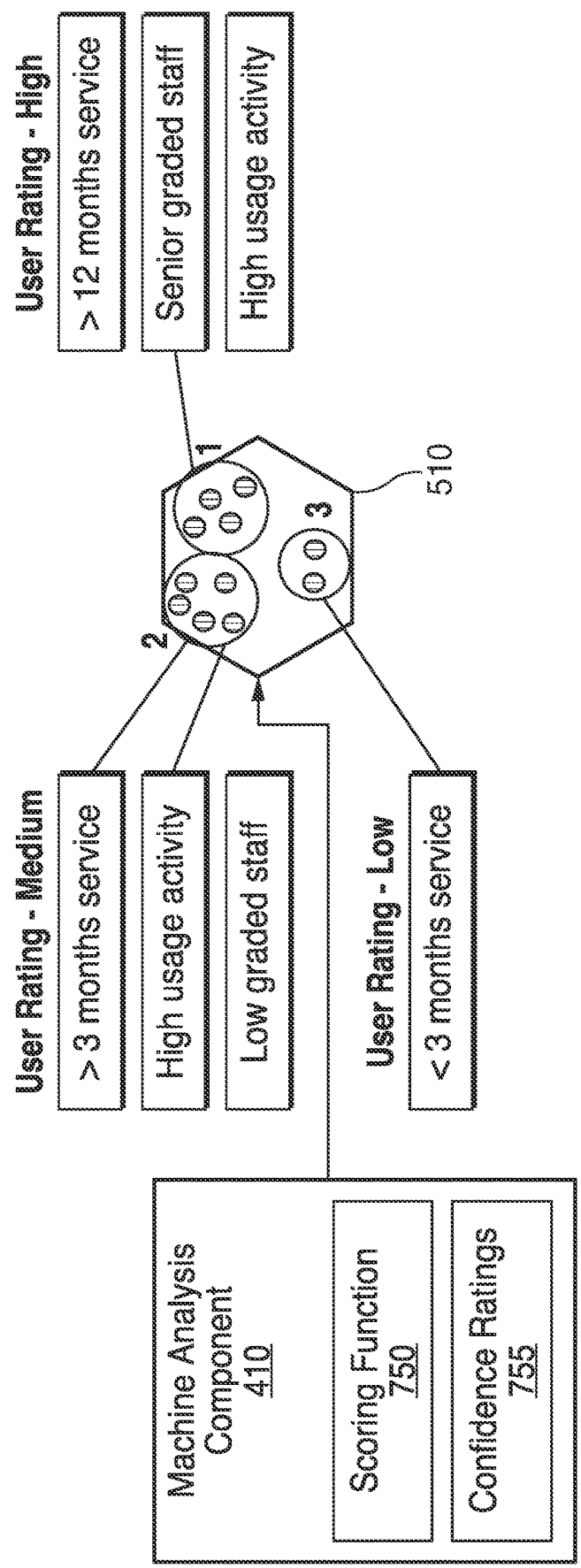
FIG. 7 is a block diagram illustrating how a machine analysis component can assign confidence ratings to users according to certain embodiments.

FIG. 7 is a diagram illustrating an exemplary technique for executing a scoring function 750 according to certain embodiments. The scoring function 750 determines a confidence rating 755 for each user that estimates the trustworthiness of the crowdsource data 424 obtained from that user. In some cases, confidence ratings 755 may only be generated for trusted users 610. In other embodiments, confidence ratings may be generated for both trusted users 610 and non-trusted users 620.

In certain embodiments, the confidence ratings 755 may be divided into three categories: low (indicating a low level of confidence); medium (indicating a medium level of confidence; and high (indicating a high level of confidence). The machine analysis component 410 can use various metrics to determine and/or assign confidence ratings 755 to the users. Exemplary metrics utilized to generate the confidence ratings 755 can include one or more the aforementioned metrics that are utilized by the reliability assessment function 650 (e.g., HR information, authentication information, access approval information, application usage activity, VPN information, seniority grade, and/or user type).

Many other metrics also may be used to generate or determine the confidence ratings 755. Additionally, the types of confidence ratings 755 can vary. For example, rather than assigning users to predetermined rating groups (e.g., low, medium, high), the confidence ratings 755 may represent numerical scores that are computed within a normalized range (e.g., on a scale from 0-1 or 1-100), whereby higher scores indicate a greater degree of confidence and lower scores indicate lesser degrees of confidence. Other variations of the confidence ratings 755 also may be utilized.

As demonstrated by FIGS. 6 and 7, the crowdsourcing component 350 can execute functions for collecting information from a particular subset of users (e.g., trusted users 620 that are identified by the reliability assessment function 650) and those users can be assigned confidence ratings 755 that indicate their trustworthiness. The confidence ratings 755 can be used to ensure that the crowdsourcing component 330 solicits accurate information pertaining to user access rights and the access model 450.

Returning to FIG. 4, at step 9, the information collected by the crowdsourcing component 350 can be stored in, or associated with, the risk model 420. All of the information (e.g., including the user access data 421, secondary source data 422, inherent rules 423, and crowdsource data 424) can be stored in one or more databases that are accessible to the access analysis component 154 and/or other components of the IdAM system 150.

The type of information gathered from the users using the crowdsourcing component 350 can vary. As mentioned above, at least a portion of the crowdsource data 424 can include data or information that indicates the application functions or features that each user can access, which can be used to understand the access rights and privileges for each of the authorization codes 520 associated with the application 130. The crowdsource data 424 also can include information indicating the business context that users utilize the application 130.

The crowdsource data 424 can be analyzed by the machine analysis component 410 to determine rights and privileges provided by each authorization code 520 and the corresponding access model 450 of the application 130. The machine analysis component 410 also can analyze the crowdsource data 424 to identify security risks associated with providing unauthorized access to the application 130. The results of the analysis performed by the machine analysis component 410 can then be stored in the risk model 420 for the application 130.

Figure 8:
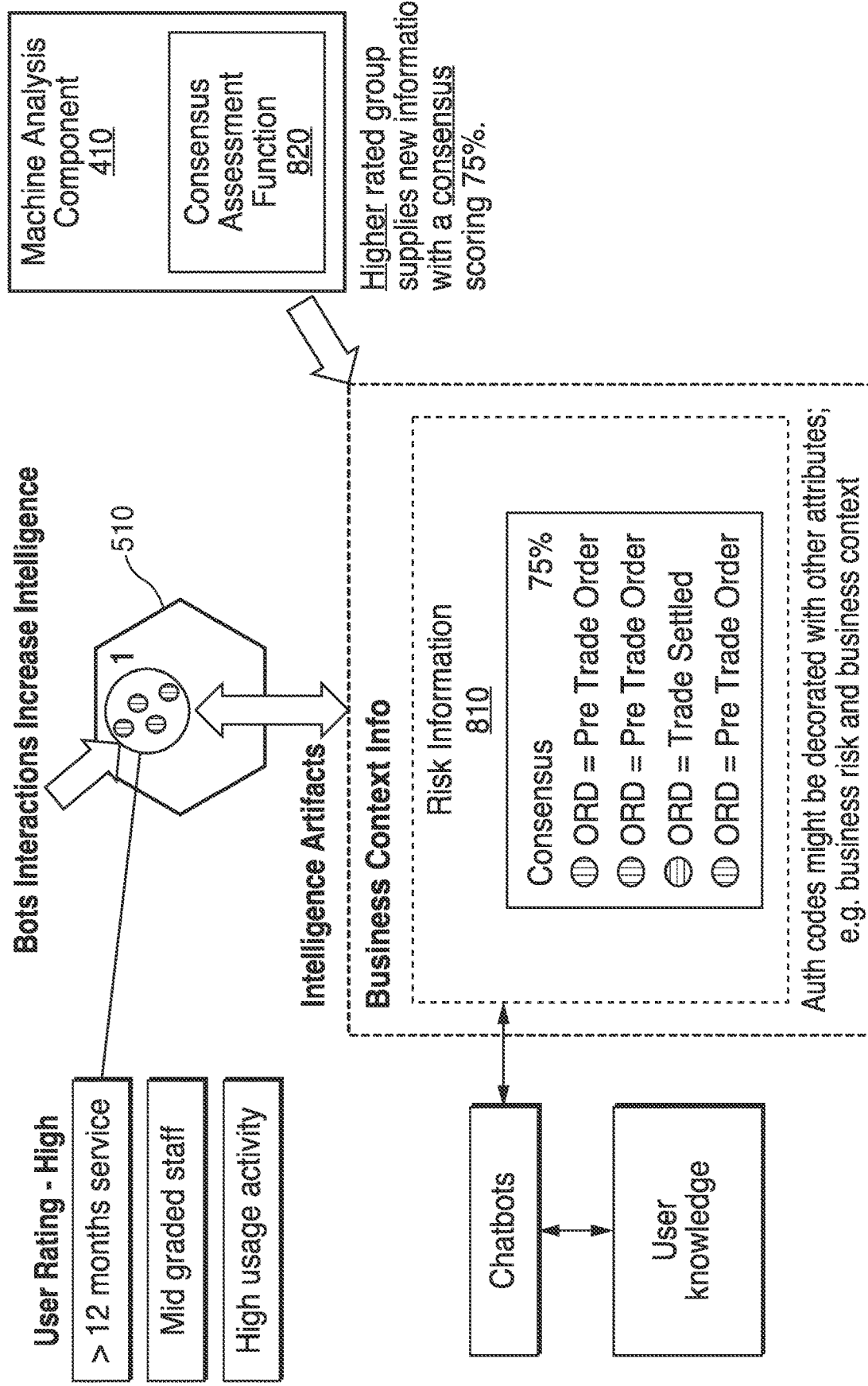
FIG. 8 is a block diagram illustrating how a machine analysis component can discern risk information that can be useful for understanding authorization codes associated with application according to certain embodiments.
Figure 9:
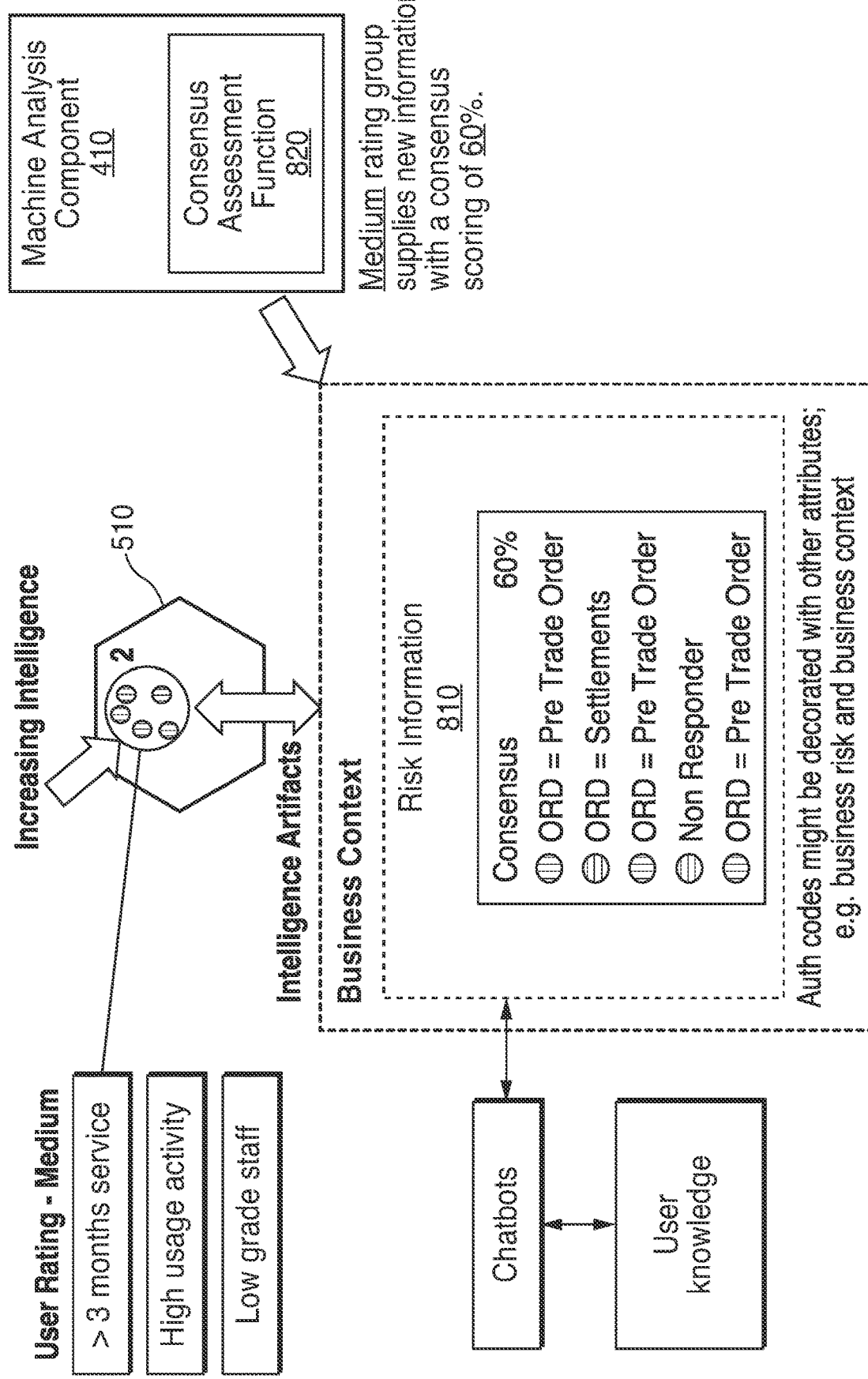
FIG. 9 is a block diagram illustrating how a machine analysis component can discern risk information that can be useful for understanding authorization codes associated with application according to certain embodiments.

FIGS. 8 and 9 illustrate how the crowdsource data 424 can be utilized to generate and assess risk information 810 associated with an application 130. Risk information 810 may be generated for each authorization code 520 associated with the application 130, and can be stored in the risk model 420 for the application 130. For each authorization code 520, the risk information 810 may indicate or identify the functionalities or features of the application 130 that are enabled or accessible with the authorization code 520. The functionalities and features enabled by each authorization code 520 can be identified, at least in part, analyzing the crowdsource data 424 generated by the crowdsourcing component 350.

In FIGS. 8 and 9, exemplary risk information 810 is generated for a legacy financial services application. The legacy financial services application may provide selective access to functionalities or features that enable pre-order trading and trade settlement functions. The usage access data 421 (and other data) collected for the application 130 may indicate that an authorization code 520 (labeled "ORD") that permits certain functionalities or features of the application 130 to be accessed by a subset of users, but may be insufficient to determine which functionalities or features of the application 130 are accessible. However, the crowdsource data 421 may include feedback from users indicating how they use the application 130 and its associated functions (e.g., whether each of the users associated with the authorization code 520 can execute pre-order trading functions and/or settlement functions). This user feedback may be utilized to derive the risk information 810.

The machine analysis component 410 component can analyze the crowdsource data 424 to determine the risk information 810, which identifies the functionalities and features of the application 130 that are enabled by each of the authorization codes 520. This risk information 810 generated by the machine analysis component 410 can be determined, at least in part, by identifying overlapping responses and/or consistency patterns in the crowdsource data 424. For example, the machine analysis component 410 may determine that a particular functionality (e.g., pre-order trading) is permitted by an authorization code 520 due to a majority of users responses stored in the crowdsource data 424 indicating that they have access to the functionality.

In certain embodiments, the machine analysis component 410 can execute a consensus assessment function 820 that is used to determine whether the collected information (e.g., the crowdsource data 424 and/or other collected information) is sufficient to determine the functionalities and features of the application 130 that enabled by each of the authorization codes 520. For example, the consensus assessment function 820 can analyze the responses or feedback in the crowdsource data 424 to predict or determine whether a particular functionality (e.g., pre-trading or settlement functionality) is enabled by an authorization code 520. A sufficient number or percentage of overlapping responses received form the users may be used to determine that a particular functionality or feature is enabled by an authorization code 520.

In some embodiments, the consensus assessment function 820 can assign different weights to the crowdsource data 424 received from the users in determining whether consensus has been achieved with respect to a particular functionality or feature being enabled by an authorization code 520. For example, the confidence ratings 755 assigned to the users may be utilized to weight the feedback provided by the users. Feedback received from users with high confidence ratings 755 may be given greater weights (e.g., a 75% degree of confidence) in determining whether a functionality or feature is enabled by an authorization code 520. Feedback received from users with lower confidence ratings 755 may be given less weight (e.g., a 60% degree of confidence) in determining whether a functionality or feature is enabled by the authorization code 520.

Returning to FIG. 4, upon achieving consensus, the machine analysis component 410 can store risk information 810 in the risk model 420 for the application 130. This risk information 810 can indicate the functionalities or features of each application that are enabled by each the authorization codes 520, and can be used to identify unauthorized access risks (e.g., to identify users with excessive access rights and/or former employees that still have access).

At step 10, the machine analysis component 410 (or other component) can gather additional information if consensus is not initially achieved and/or if the machine analysis component 410 cannot sufficiently identify the rights and privileges enabled by a particular authorization code 520. For example, the machine analysis component 410 may initially attempt to achieve consensus using the crowdsource data 424 received from a user group comprised of highly trusted users (e.g., trusted users 610). If consensus cannot be achieved solely with this information, then the crowdsourcing component 350 may expand communications to other users (e.g., other sample populations of trusted users and/or certain authoritative users). The crowdsource data 424 received from this expanded group of users may then be utilized to determine or confirm the functionalities or features of each application that are enabled by each the authorization codes 520.

At step 11, upon completion of data collection and consensus confirmation, the access analysis component 154 interfaces and/or communicates with the IGA system 330 and provides the IGA system 330 with the access model 450 for the application 130. Providing the access model 450 to the IGA system 330 enables the application 130 to be integrated with the IGA system 330. The IGA system 330 can then utilize the access model 450 to enforce access rights and privileges and perform other related functions (e.g., provisioning and de-provisioning users, enforcing segregation of duties, implementing user role management, managing access logs, and providing analytics and reporting).

At step 12, the access analysis component 154 can generate risk analysis information that identifies access risks associated with the access model 450. The risk analysis information generated by the access analysis component 154 can include any information involving actual or potential risks associated with permitting unauthorized access to the application 130. For example, the information generated by the access analysis component 154 can include any or all of the following: 1) data that characterizes the types of access risks associated with the application 130 and/or access model 450; 2) data identifying users that appear to have excessive access rights or privileges; 3) data identifying former users (e.g., former employees) whose access rights and privileges have not yet to be revoked; 4) data identifying previous incidents or attempts by unauthorized users to gain access to the application 130; and/or 5) recommendations to change access rights and privileges of users. The risk analysis information can be provided to the IGA system 330, one or more administrator users, and/or one or more line managers.

At step 13, if additional information about the access model 450 of the application 130 is desired, the crowdsourcing component 350 can be reconfigured to request and retrieve this additional information from the users. Once reconfigured, the access analysis component 154 can repeat steps 8 through 12.

Figure 10:
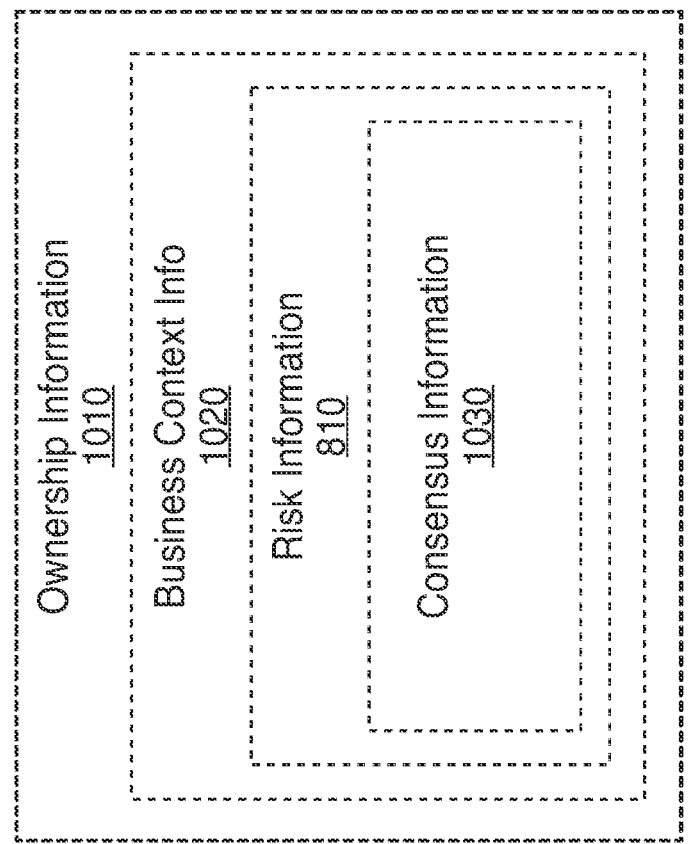
FIG. 10 is a block diagram illustrating how data or information that can be determined by an IdAM system according to certain embodiments.

In addition to integrating applications 130 with the IGA system 330, the IdAM system 150 can be used to further ongoing access control operations associated with the applications 130. As illustrated in FIG. 10, the information stored for each application 130 can include ownership information 1010 (e.g., identifying a provider or developer of the application); business context information (e.g., identifying the business context or operations for which the application 130 is used). The information stored for each application 130 also can the risk information 810 (e.g., identifying potential access risks associated with the application 130); and/or consensus information 1030 (e.g., indicating the access rights and privileges associated with authorization codes 520 used to access the application 130).

Figure 11:
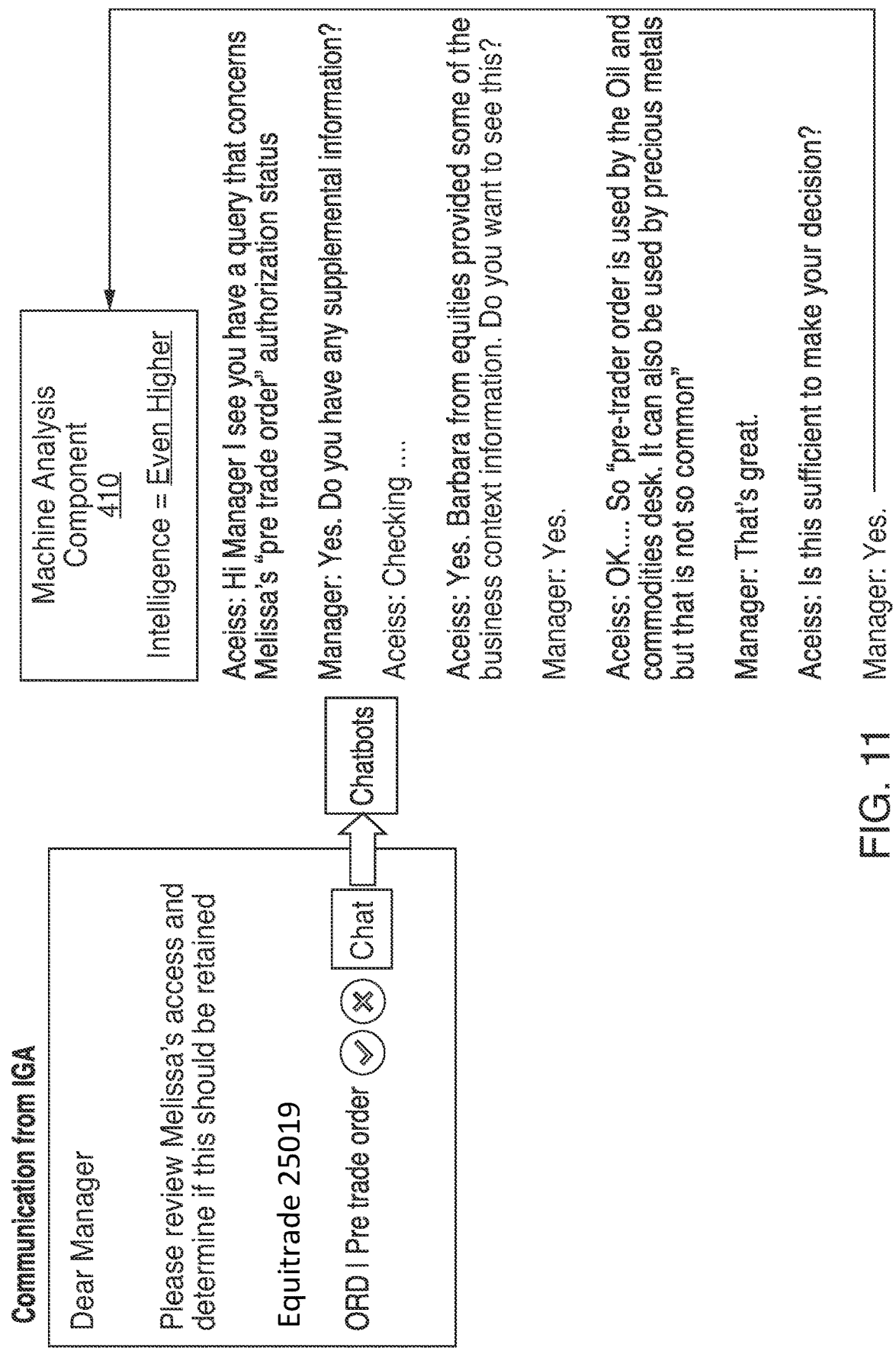
FIG. 11 is a block diagram illustrating how information collected by the IdAM system can be used to further ongoing operations according to certain embodiments.

The repository of information collected by the IdAM system 150 be used by various administrator users (e.g., users of the IGA system 330, and/or managers who certify employee access requests) to ensure enforcement of appropriate access rights and privileges among the users. For example, as illustrated in FIG. 11, in some cases, the administrator users can communicate with the chatbots to confirm details related to ongoing and/or previous events involving (actual or potential) unauthorized access provision and/or attempts.

Figure 12:
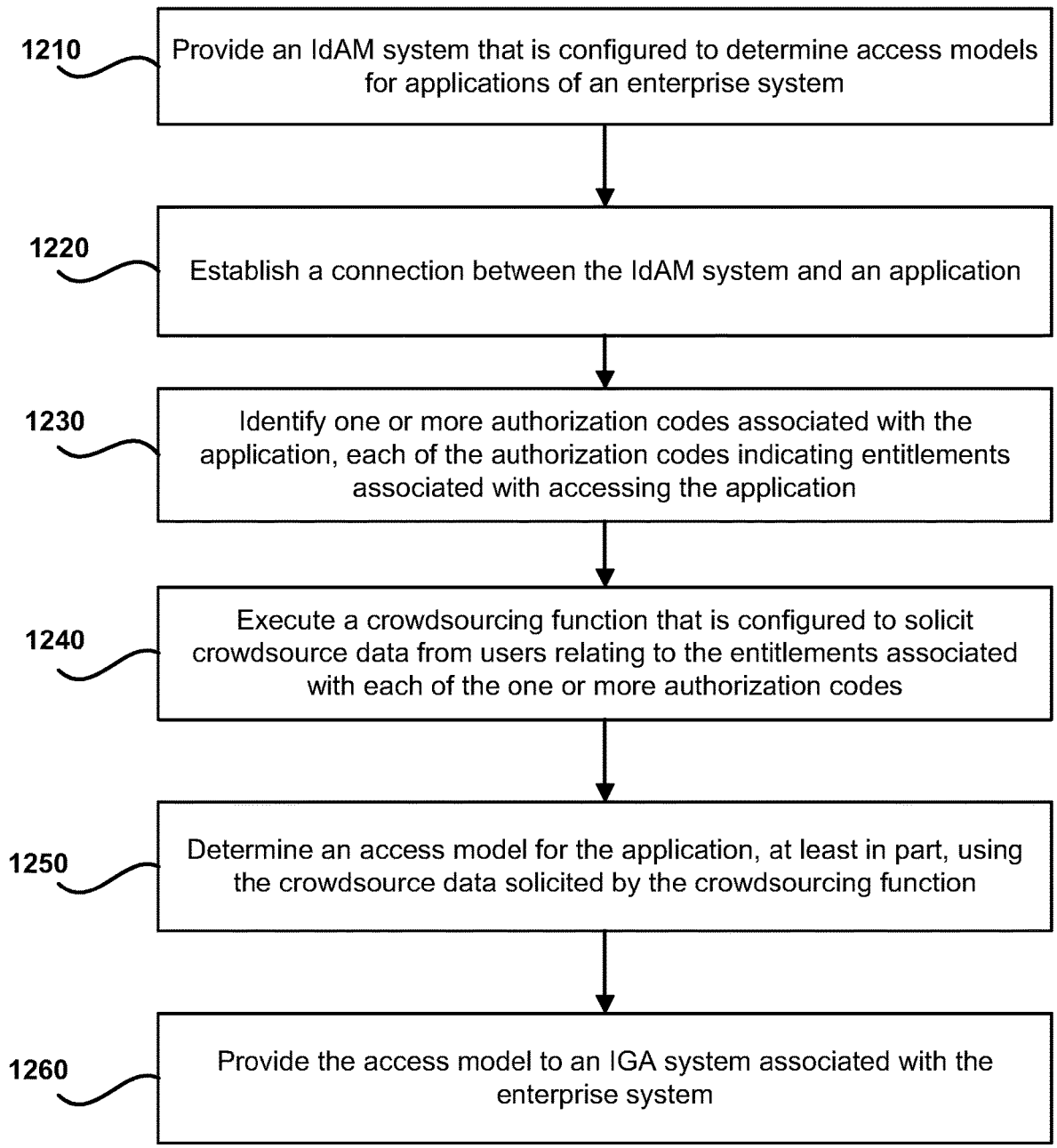
FIG. 12 is an exemplary method according to certain embodiments.

FIG. 12 illustrates a flow chart for an exemplary method 1200 that can be utilized to determine an access model and/or onboard an application according to certain embodiments. Method 1200 is merely exemplary and is not limited to the embodiments presented herein. Method 1200 can be employed in many different embodiments or examples not specifically depicted or described herein. In some embodiments, the steps of method 1200 can be performed in the order presented. In other embodiments, the steps of method 1200 can be performed in any suitable order. In still other embodiments, one or more of the steps of method 1200 can be combined or skipped. In many embodiments, system 100, computing device 110, server 120, IdAM system 150, and/or IGA system 330 can be suitable to perform method 1200 and/or one or more of the steps of method 1200. In these or other embodiments, one or more of the steps of method 1200 can be implemented as one or more computer instructions configured to run on one or more processing devices and configured to be stored at one or more non-transitory memory storage devices. Such non-transitory memory storage devices can be part of a computer system, such as system 100, computing device 110, and/or server 120.

At step 1210, access is provided to an IdAM system that is configured to determine access models for applications of an enterprise system.

At step 1220, a connection is established between the IdAM system and an application.

At step 1230, one or more authorization codes associated with the application are identified. Each of the authorization codes may indicate entitlements associated with accessing the application. In some embodiments, the application may include an agent that communicates with the IdAM system, and assists with identifying the authorization codes and transmitting the authorization codes to the IdAM system. Additionally, in some cases, the information transmitted to the IdAM system by the agent can include data indicating user access event activity, which can provide insight into what authorization codes are most actively used.

At step 1240, a crowdsourcing function is executed (e.g., by a crowdsource component associated with the IdAM system) that is configured to solicit crowdsource data from users relating to the entitlements associated with each of the one or more authorization codes.

At step 1250, an access model for the application is determined, at least in part, using the crowdsource data solicited by the crowdsourcing function and optionally enhanced (with agents) describing how it might be used by observing user access activity. In some embodiments, the data transmitted by the agent to the IdAM system (e.g., which can indicate user access activity that is observed or monitored) also may be utilized to determine the access model.

At step 1260, the access model is provided to an IGA system associated with the enterprise system. The IGA system may utilize the access model to onboard the application into the enterprise system (e.g., a private or public cloud system), and to execute ongoing identity management and access control functions for the application in the enterprise system (e.g., associated with provisioning and de-provisioning users, enforcing segregation of duties, implementing user role management, providing access to the application or associated features, etc.).

As evidenced by this disclosure, the security techniques disclosed herein provide numerous advantages to enterprise systems. For example, the abstract data model utilized by the onboarding system permits large numbers of applications to be onboarded quickly and easily into an enterprise system.

Additionally, the applications can be onboarded without modifying of the source codes of the applications. The data model also permits the IdAM system to generate and maintain an identity and access catalog, which can be used to ensure compliance with internal and regulatory security polices and which can be easily modified as desired (e.g., to change permissions, add entitlement profiles, etc.). Furthermore, these techniques provide redundant mechanisms for ensuring that applications are accessed in accordance with desired authorization and security policies.

Additionally, the techniques described herein provide a framework that enables legacy applications and/or other applications to be integrated into modern enterprise systems. Amongst other things, this technological framework provides a computerized means to identify inherent access risk that would otherwise go unchallenged and/or to understand the access rights and privileges that are provided by authorization codes associated with the applications. Many other advantages would be apparent to one of skilled in the art.

As evidenced by the disclosure herein, the inventive techniques set forth in this disclosure are rooted in computer technologies that overcome existing problems in enterprises systems, specifically problems dealing with implementing access controls for applications offered through enterprise systems, onboarding applications into the enterprise systems. The technologies described in this disclosure provide a technical solution for overcoming the aforementioned limitations (as well as other limitations) associated with known techniques and systems. For example, the cybersecurity technologies described in this disclosure may utilize improved data models, and onboarding techniques to integrate applications into an enterprise system in a secure manner and without modifying sources codes of applications. Moreover, these technologies permit simulations of access configurations to be tested before deployment of the applications. Furthermore, in many embodiments, the IdAM systems can be configured to dynamically monitor file access attempts pertaining to onboarded applications, and to dynamically prevent unauthorized access attempts based on stored application definitions. Even further, these technologies permit the IdAM systems to enforce access controls across various applications in a uniform manner, despite the heterogeneity of the applications. This technology-based solution marks an improvement over existing systems for these and other reasons.

In certain embodiments, a system is provided. The system includes one or more computing devices comprising one or more processors and one or more non-transitory storage devices for storing instructions, wherein execution of the instructions by the one or more processors causes the one or more computing devices to: provide an identify and access management (IdAM) system that is configured to determine access models for applications of an enterprise system; establish a connection between the IdAM system and an application; identify one or more authorization codes associated with the application, each of the authorization codes indicating entitlements associated with accessing the application; execute, using the IdAM system, a crowdsourcing function that is configured to solicit crowdsource data from users relating to the entitlements associated with each of the one or more authorization codes; and determine, using the IdAM system, an access model for the application, at least in part, using the crowdsource data solicited by the crowdsourcing function.

In certain embodiments, a method is provided. The method may be implemented via execution of computing instructions configured to run at one or more processing devices and configured to be stored on non-transitory computer-readable media. The method comprises: providing an identify and access management (IdAM) system that is configured to determine access models for applications of an enterprise system; establishing a connection between the IdAM system and an application; identifying one or more authorization codes associated with the application, each of the authorization codes indicating entitlements associated with accessing the application; executing, using the IdAM system, a crowdsourcing function that is configured to solicit crowdsource data from users relating to the entitlements associated with each of the one or more authorization codes; and determining, using the IdAM system, an access model for the application, at least in part, using the crowdsource data solicited by the crowdsourcing function.

In certain embodiments, a computer program product is provided. The computer program product comprises a non-transitory computer-readable medium including instructions for causing a computer to: provide an identify and access management (IdAM) system that is configured to determine access models for applications of an enterprise system; establish a connection between the IdAM system and an application; identify one or more authorization codes associated with the application, each of the authorization codes indicating entitlements associated with accessing the application; execute, using the IdAM system, a crowdsourcing function that is configured to solicit crowdsource data from users relating to the entitlements associated with each of the one or more authorization codes; and determine, using the IdAM system, an access model for the application, at least in part, using the crowdsource data solicited by the crowdsourcing function.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system of one or more computing devices comprising one or more processors and one or more non-transitory storage devices for storing instructions, wherein execution of the instructions by the one or more processors causes the one or more computing devices to:

provide an identify and access management (IdAM) system that is configured to determine access models for legacy applications of an enterprise system and integrate the legacy applications into a private or public cloud-based environment;

establish a connection between the IdAM system and a legacy application;

identify one or more authorization codes associated with the legacy application, each of the authorization codes indicating entitlements associated with accessing the legacy application or features associated with the legacy application, wherein at least a portion of the entitlements associated with the one or more authorization codes is unknown or unconfirmed;

execute, using the IdAM system, a crowdsourcing function that is configured to solicit crowdsource data that can be utilized, at least in part, to validate the portion of entitlements that is unknown or unconfirmed;

determine, using the IdAM system, an access model for the legacy application, at least in part, using the crowdsource data solicited by the crowdsourcing function; and integrate the legacy application into the private or public cloud-based environment, at least in part, using the access model for the legacy application.

2. The system of claim 1, wherein:

the access model is provided to, or accessed by, an identity and governance administration (IGA) system associated with the enterprise system; and the access model enables the IGA system to onboard the legacy application into the enterprise system.

3. The system of claim 2, wherein the IGA system facilitates a centralized orchestration of user identity management and access control for the legacy applications of the enterprise system, at least in part, using the access models determined by the IdAM system.

4. The system of claim 1, wherein the crowdsourcing function is configured to solicit the crowdsource data relating to the entitlements from one or more of:

a first set of users comprising one or more end-users of the enterprise system;

a second set of users comprising one or more administrator users associated with the enterprise system; or a third set of users comprising one or more application developers associated the developing or maintaining the legacy application.

5. The system of claim 1, wherein a reliability assessment function is executed to identify the users from whom the crowdsource data is solicited.

6. The system of claim 5, wherein:

a scoring function determines confidence ratings for the users; and the reliability assessment function identifies the users based, at least in part, on the confidence ratings.

7. The system of claim 1, wherein:

the legacy application is configured with an agent;

the agent is configured to track user access activities;

the agent is configured to communicate with the IdAM system, and transmit information to the IdAM system indicating the user access activities.

8. The system of claim 1, wherein determining the access model for the legacy application further includes:

retrieving, over the connection between the IdAM system and the legacy application, user access data from the legacy application, the user access data at least indicating the one or more authorization codes associated with the legacy application;

retrieving secondary source data from one or more databases within the enterprise system, the one or more databases being external to the legacy application itself;

identifying inherent access rules associated with the legacy application based, at least in part, on the user access data or secondary source data; and determining the access model, at least in part, using the crowdsource data, user access data, secondary source data, and inherent access rules.

9. The system of claim 1, wherein:

the IdAM system is situated between the legacy application and an identity and governance administration (IGA) system;

the access model determined by the IdAM system enables the IGA system to onboard the legacy application; and after onboarding, the IGA system utilizes the access model to execute ongoing identity management and access control functions for the legacy application in the enterprise system.

10. A method implemented via execution of computing instructions configured to run at one or more processing devices and configured to be stored on non-transitory computer-readable media, the method comprising:

providing an identify and access management (IdAM) system that is configured to determine access models for legacy applications of an enterprise system and integrate the legacy applications into a private or public cloud-based environment;

establishing a connection between the IdAM system and a legacy application;

identifying one or more authorization codes associated with the legacy application, each of the authorization codes indicating entitlements associated with accessing the legacy application or features associated with the legacy application, wherein at least a portion of the entitlements associated with the one or more authorization codes is unknown or unconfirmed;

executing, using the IdAM system, a crowdsourcing function that is configured to solicit crowdsource data that can be utilized, at least in part, to validate the portion of entitlements that is unknown or unconfirmed;

determining, using the IdAM system, an access model for the legacy application, at least in part, using the crowdsource data solicited by the crowdsourcing function; and integrate the legacy application into the private or public cloud-based environment, at least in part, using the access model for the legacy application.

11. The method of claim 10, wherein:

the access model is provided to, or accessed by, an identity and governance administration (IGA) system associated with the enterprise system; and the access model enables the IGA system to onboard the legacy application into the enterprise system.

12. The method of claim 11, wherein the IGA system facilitates a centralized orchestration of user identity management and access control for the legacy applications of the enterprise system, at least in part, using the access models determined by the IdAM system.

13. The method of claim 10, wherein the crowdsourcing function is configured to solicit the crowdsource data relating to the entitlements from one or more of:

a first set of users comprising one or more end-users of the enterprise system;

a second set of users comprising one or more administrator users associated with the enterprise system; or a third set of users comprising one or more application developers associated the developing or maintaining the legacy application.

14. The method of claim 10, wherein a reliability assessment function is executed to identify the users from whom the crowdsource data is solicited.

15. The method of claim 14, wherein:
a scoring function determines confidence ratings for the users; and
the reliability assessment function identifies the users based, at least in part, on the confidence ratings.

16. The method of claim 10, wherein:
the legacy application is configured with an agent;
the agent is configured to track user access activities; and
the agent is configured to communicate with the IdAM system, and transmit information to the IdAM system indicating the user access activities.

17. The method of claim 10, wherein determining the access model for the legacy application further includes:
retrieving, over the connection between the IdAM system and the legacy application, user access data from the legacy application, the user access data at least indicating the one or more authorization codes associated with the legacy application;
retrieving secondary source data from one or more databases within the enterprise system, the one or more databases being external to the legacy application itself;
identifying inherent access rules associated with the legacy application based, at least in part, on the user access data or secondary source data; and
determining the access model, at least in part, using the crowdsource data, user access data, secondary source data, and inherent access rules.

18. The method of claim 10, wherein:
the entitlements associated with the one or more authorization codes are initially unknown or uncertain; and
the crowdsource data is utilized, at least in part, to determine or confirm the entitlements associated with the one or more authorization codes.

19. A computer program product, the computer program product comprising a non-transitory computer-readable medium including instructions for causing a computer to:
provide an identify and access management (IdAM) system that is configured to determine access models for legacy applications of an enterprise system and integrate the legacy applications into a private or public cloud-based environment;
establish a connection between the IdAM system and a legacy application;
identify one or more authorization codes associated with the legacy application, each of the authorization codes indicating entitlements associated with accessing the legacy application or features associated with the legacy application, wherein at least a portion of the entitlements associated with the one or more authorization codes is unknown or unconfirmed;
execute, using the IdAM system, a crowdsourcing function that is configured to solicit crowdsource data that can be utilized, at least in part, to validate the portion of entitlements that is unknown or unconfirmed;
determine, using the IdAM system, an access model for the legacy application, at least in part, using the crowdsource data solicited by the crowdsourcing function; and
integrate the legacy application into the private or public cloud-based environment, at least in part, using the access model for the legacy application.

\* \* \* \* \*